(12) United States Patent
Fitzsimmons

(10) Patent No.: US 11,623,618 B2
(45) Date of Patent: Apr. 11, 2023

(54) VEHICLE WASHER BRUSH PANEL WITH MOLD-INJECTED PARTIALLY EMBEDDED NODULES, CHANNEL WELL DEVICES, AND METHODS FOR MANUFACTURING SAME

(71) Applicant: IWASH TECHNOLOGY LLC, Milwaukie, OR (US)

(72) Inventor: Jeff R. Fitzsimmons, Mulino, OR (US)

(73) Assignee: iWash Technology LLC, Milwaukie, OR (US)

( * ) Notice: Subject to any disclaimer, the term of this patent is extended or adjusted under 35 U.S.C. 154(b) by 354 days.

(21) Appl. No.: 16/815,812

(22) Filed: Mar. 11, 2020

(65) Prior Publication Data

US 2020/0298805 A1    Sep. 24, 2020

Related U.S. Application Data

(60) Provisional application No. 62/822,394, filed on Mar. 22, 2019, provisional application No. 62/959,004, filed on Jan. 9, 2020.

(51) Int. Cl.
| | |
|---|---|
| *B60S 3/04* | (2006.01) |
| *B60S 3/00* | (2006.01) |
| *A46B 13/00* | (2006.01) |

(52) U.S. Cl.
CPC ............ *B60S 3/048* (2013.01); *A46B 13/005* (2013.01); *B60S 3/00* (2013.01); *B60S 3/04* (2013.01)

(58) Field of Classification Search
CPC .... B60S 3/04; B60S 3/048; B60S 3/06; B60S 3/00
See application file for complete search history.

(56) References Cited

U.S. PATENT DOCUMENTS

| | | | |
|---|---|---|---|
| 3,765,043 A | 10/1973 | Lesser | |
| 4,057,866 A | 11/1977 | Belanger | |
| 5,461,745 A * | 10/1995 | Nittoli | A46B 3/18 |
| | | | 451/469 |
| 6,279,190 B1 | 8/2001 | Belanger et al. | |

(Continued)

OTHER PUBLICATIONS

International Search Report, PCT/US2020/022449, dated Jul. 21, 2020.
Written Opinion, PCT/US2020/022449, dated Jul. 21, 2020.

*Primary Examiner* — Randall E Chin
(74) *Attorney, Agent, or Firm* — Renaissance IP Law Group, LLP; David A. Crowther

(57) ABSTRACT

A vehicle washer brush panel and channel well device, and methods for manufacturing the same. The vehicle washer brush panel includes a contiguous section, elongated brush panel fingers, and partially embedded nodules. A method for manufacturing a vehicle washer brush panel includes creating a hole near an edge of a cloth brush panel, sandwiching the cloth brush panel between an upper section and a lower section of a die, aligning a mold cavity of the die with the hole, and mold-injecting an injection material through an injection orifice of the die so that the injection material fills the hole in the cloth brush panel and the mold cavity of the die. A vehicle washer channel well device includes an elongated well, a first flange, a second flange, a first elongated screw channel, and a second elongated screw channel. One or more vehicle washer channel well devices are secured to a frame.

19 Claims, 38 Drawing Sheets

(56) References Cited

U.S. PATENT DOCUMENTS

2004/0010878 A1* 1/2004 Levesque ............. A46B 13/005
 15/53.2
2009/0133728 A1 5/2009 Brillouet et al.
2010/0017979 A1 1/2010 Ennis
2013/0104332 A1 5/2013 Belanger et al.
2016/0193987 A1* 7/2016 Favagrossa ............... B60S 3/06
 15/53.2

* cited by examiner 105  110

105  110  115

VEHICLE WASHER BRUSH PANEL WITH MOLD-INJECTED PARTIALLY EMBEDDED NODULES, CHANNEL WELL DEVICES, AND METHODS FOR MANUFACTURING SAME

PRIOR APPLICATION DATA

This application claims the benefit of U.S. Provisional Patent Application Ser. No. 62/822,394, filed on Mar. 22, 2019, and claims the benefit of U.S. Provisional Patent Application Ser. No. 62/959,004, filed on Jan. 9, 2020, the contents of which are hereby included by reference.

TECHNICAL FIELD

This application pertains to automatic vehicle washers, and more particularly, to a vehicle washer brush panel with mold-injected partially embedded nodules, vehicle washer channel well devices, and a method for manufacturing same.

BACKGROUND

Automatic vehicle wash systems have proliferated in recent years. The convenience and quality of wash afforded by such vehicle wash systems have improved to the point that most kinds of vehicles can be washed using such systems. Nevertheless, conventional vehicle wash systems are deficient in that a core (e.g., hub or drum) component that holds the washer brush panels in place wears out over time, and the washer brush panels get stuck in the core such that it becomes very difficult or even impossible to remove the brush panels from the core. Since the cloth washer brush panels need to be periodically replaced due to normal wear and tear, it becomes quite an ordeal to do the replacement due to problems with how conventional brush panels fit within the core. Quite often the core is irretrievably damaged in the process. Accordingly, it is very difficult to change the cloth material when needed because the cloth brush panels become very difficult to slide out of the core over time. It is a time consuming and expensive task to make a proper replacement of the vehicle washer brush panels. Embodiments of the inventive concept address these and other limitations in the prior art.

Figure 1A:
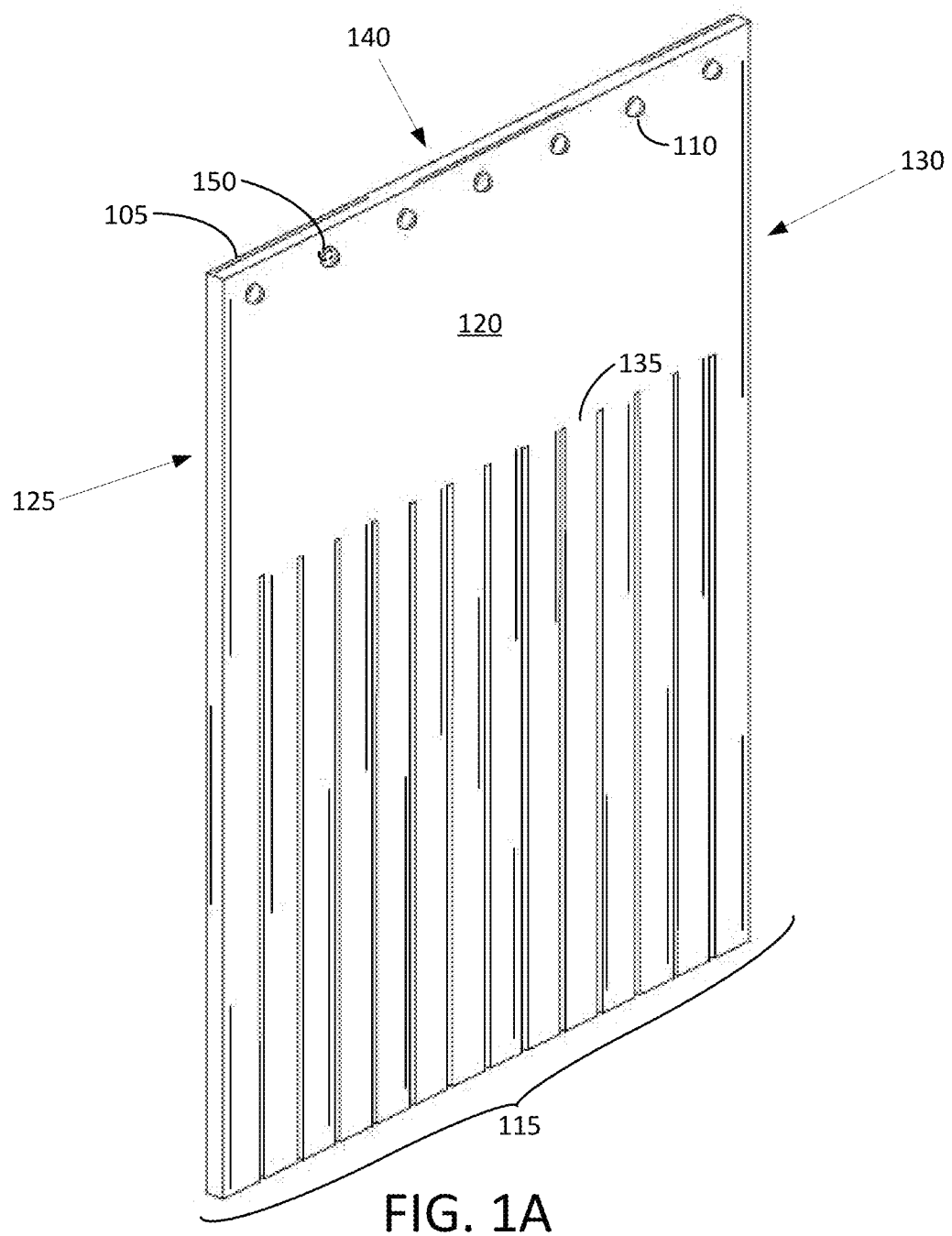
FIG. 1A illustrates a perspective view of vehicle washer brush panel with partially embedded nodules in accordance with some embodiments of the present inventive concept.

The foregoing and other features of the inventive concept will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first brush could be termed a second brush, and, similarly, a second brush could be termed a first brush, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the present inventive concept include a process of manufacturing vehicle washer brush panels by indexing and disposing a series of holes along an edge of each vehicle washer brush panel, and mold-injecting a material into each hole to form a rounded nodule. The material can be nylon, polypro, plastic, a hotmelt, or any suitable material substance that can be mold-injected using a die as disclosed herein. The completed vehicle washer brush panels includes hardened nodules along one of the edges thereof, which can be slid into and slid out of aluminum slots of a vehicle washer brush core (e.g., hub or drum). The rounded nodules need not make much contact with the aluminum slots or channels that slide up and down the brush core. The nodules can be spaced apart by any suitable distance. For example, each nodule can be ¼", ½", or indexed next to each other to allow for minimal surface contact inside the aluminum slots of the vehicle washer brush core.

Accordingly, the ease of insertion and extraction is increased relative to conventional sewed plastic strips and rods that make 100% or near 100% surface contact within aluminum slots of the vehicle washer brush core, which makes them almost impossible to remove after being in-use in a carwash for a period of time because of the stress the conventional long plastic rods have on the slots of the vehicle washer brush core. Conventional brush panels have long plastic flaps and rods sewed along a side of the panel, therefore making 100% surface contact inside the slots of the vehicle washer brush core. Corrosion of the slots in the car wash environment due to chemicals, dirt and water that make it difficult to slide the conventional brush panels up and down with the conventional long rods that are sewn to the side of the conventional brush panels.

In some embodiments, the nodules can be 3D printed into the brush panels in accordance with embodiments of the present inventive concept. The 3D printer head can have a controller that feeds Acrylonitrile butadiene styrene (ABS) plastic into the mold, by way of injecting into the die. Some embodiments can include tooling equipment that can manufacture a high-volume quantity of vehicle washer brush panels having the partially embedded nodules.

Figure 1B:
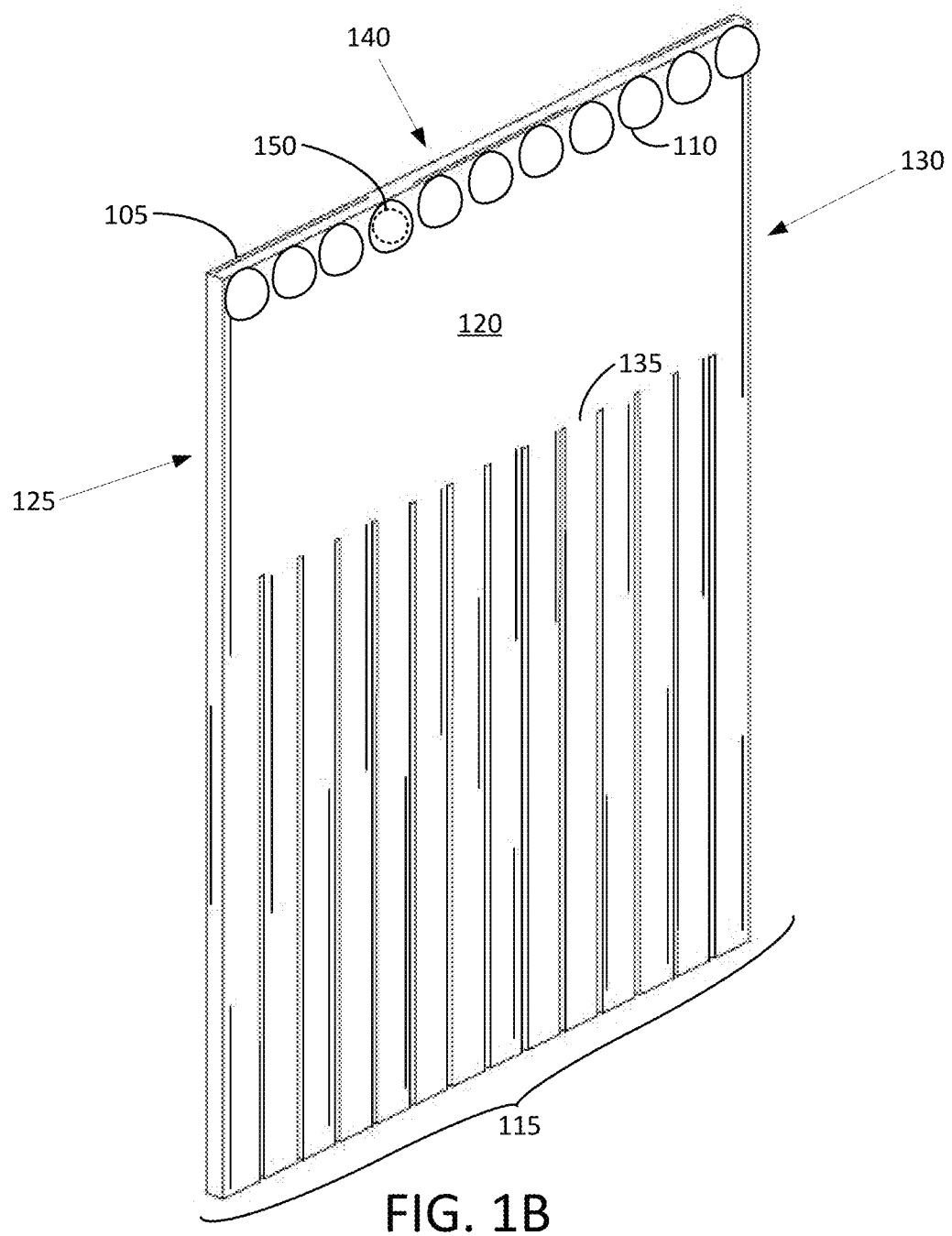
FIG. 1B illustrates a perspective view of another vehicle washer brush panel with partially embedded nodules that are larger and closer together in accordance with some embodiments of the present inventive concept.

FIG. 1A illustrates a perspective view of vehicle washer brush panel 105 with partially embedded nodules 110 in accordance with some embodiments of the present inventive concept. FIG. 1B illustrates a perspective view of another vehicle washer brush panel 105 with partially embedded nodules 110 that are larger and closer together in accordance with some embodiments of the present inventive concept. It will be understood that the partially embedded nodules 110 can be of any suitable size and can be spaced apart by any suitable distance. It will also be understood that any suitable number of partially embedded nodules 110 can be included on a vehicle washer brush panel 105. In some embodiments, some of the partially embedded nodules 110 can be touching adjacent partially embedded nodules 110. In some embodiments, the larger partially embedded nodules 110 as shown in FIG. 1B provide better support of the vehicle washer brush panel 105 to reduce or eliminate sagging of the vehicle washer brush panel 105 when the vehicle washer brush panel 105 is wet.

The vehicle washer brush panel 105 can include a multiple elongated brush panel fingers 115 for cleaning or drying a vehicle while the vehicle is passing through an automated vehicle washing system. Each of the multiple elongated brush panel fingers 115 can be connected to a contiguous section 120 at a corresponding finger junction (e.g., 135). The contiguous section 120 can extend contiguously from a first side edge 125 to a second side edge 130 of the vehicle washer brush panel 105. The contiguous section 120 may also extend contiguously from a third side edge 140 of the vehicle washer brush panel 105 to each of multiple finger junctions (e.g., 135) joining the multiple elongated brush panel fingers 115 to the contiguous section 120. The elongated brush panel fingers 115 can be made of a durable and flexible cloth material.

The nodules 110 can be made of a hard or hardened material such as nylon, polypro, plastic, a hotmelt, or any suitable material substance that can be mold-injected using a die into the contiguous section 120, as further described below. The hard or hardened material can be harder than the durable cloth material. The nodules 110 can be partially embedded within cloth material of the vehicle washer brush panel 105. The nodules 110 can be securely affixed to and partially disposed within the cloth material of the contiguous section 120 of the vehicle washer brush panel 105.

Each of the nodules 110 can be mold-injected, for example, into corresponding openings or holes (e.g., 150) that can be pre-cut into the vehicle washer brush panel 105. In other words, prior to partially embedding the nodules 110 into the cloth material of the vehicle washer brush panel, multiples openings or holes (e.g., 150) can be made in the cloth material of the vehicle washer brush panel 105, and the each of the nodules 110 can be at least partially embedded in the openings or holes (e.g., 150).

The nodules 110 may be disposed near the third side edge 140 of the vehicle washer brush panel 105 and arranged in substantially a straight line that is parallel to the third side edge 140. The nodules 110 can be spaced apart from each other, and spaced apart from the third side edge 140 such that they can be easily slid into and out of slots of a core (e.g., hub or drum) of a vehicle washer system, as further described below.

In some embodiments, the multiple elongated brush panel fingers 115 and the contiguous section 120 can be cut from an original contiguous piece of vehicle washer brush panel material, such that after the cutting, the contiguous section 120 and the multiple elongated brush panel fingers 115 are components of the vehicle washer brush panel 105. In other words, the multiple elongated brush panel fingers 115 may remain joined contiguously with the contiguous section 120 at the finger junctions (e.g., 135). In some embodiments, the multiple elongated brush panel fingers 115 can be laser cut. In some embodiments, the multiple elongated brush panel fingers 115 can be separately cut and joined later to the contiguous section 120 using connection means such as sewing, gluing, stitching, weaving, or the like.

Figure 2A:
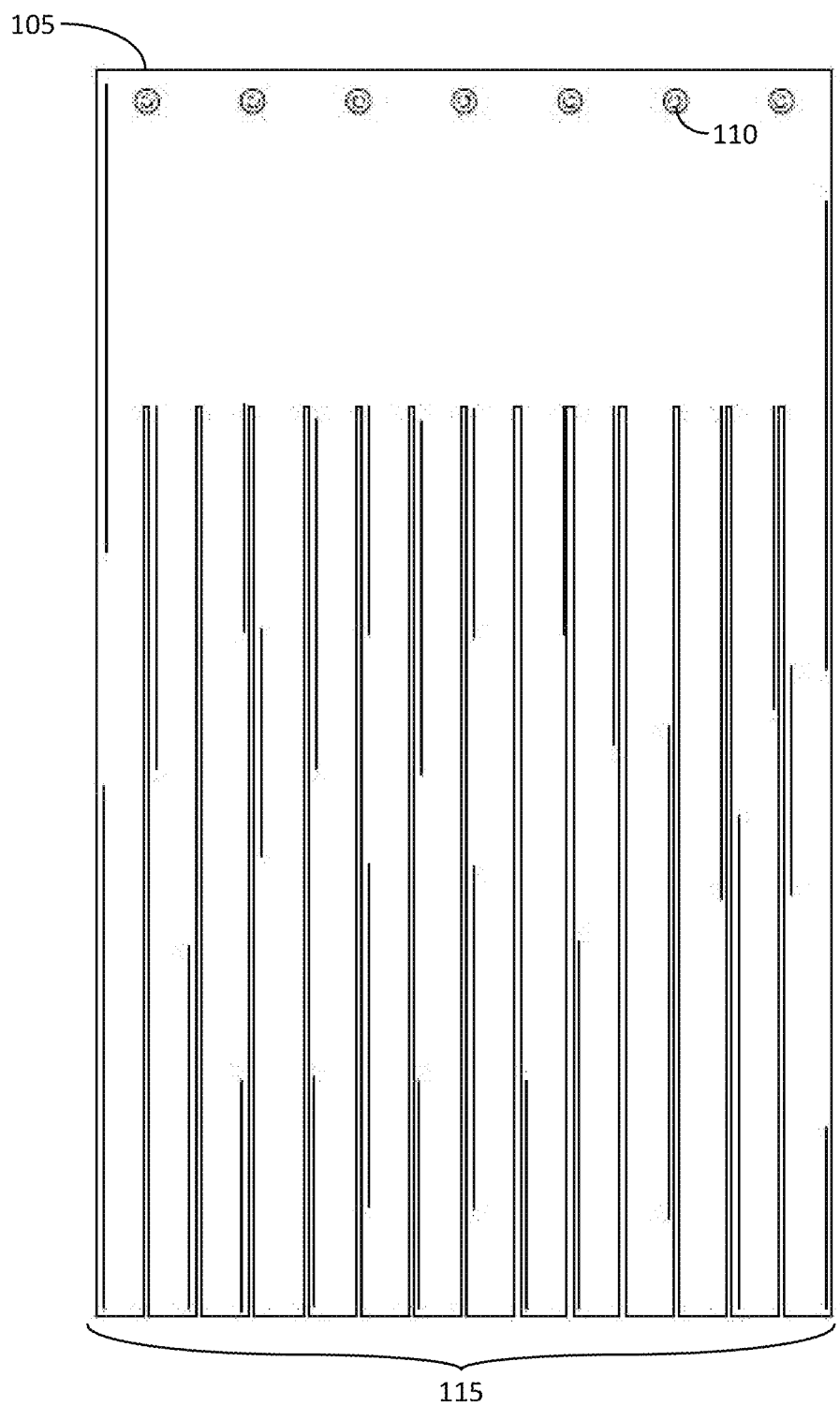
FIG. 2A illustrates a front view of the vehicle washer brush panel of FIG. 1A in accordance with the some embodiments of the present inventive concept.
Figure 2B:
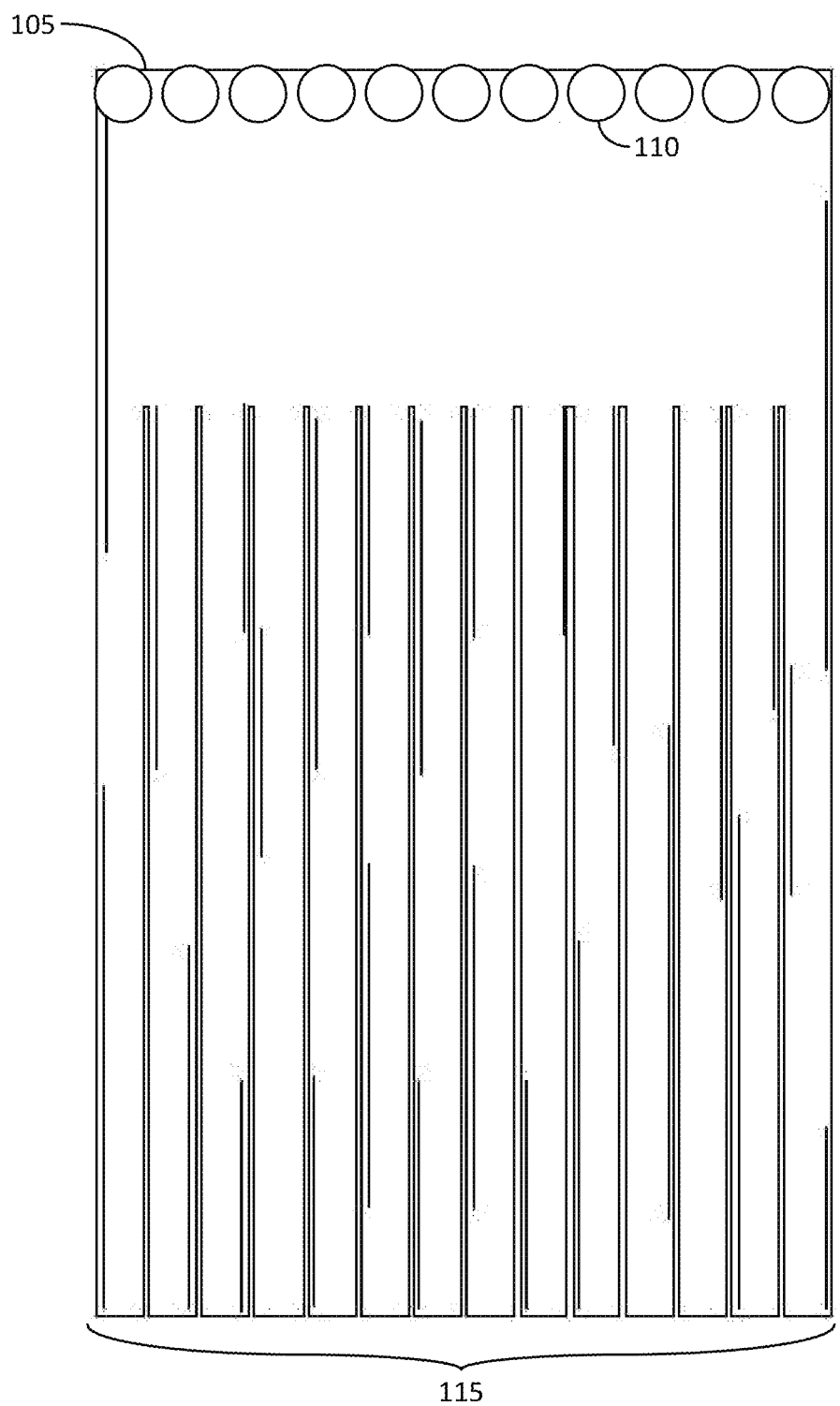
FIG. 2B illustrates a front view of the vehicle washer brush panel of FIG. 1B in accordance with the some embodiments of the present inventive concept.
Figure 2C:
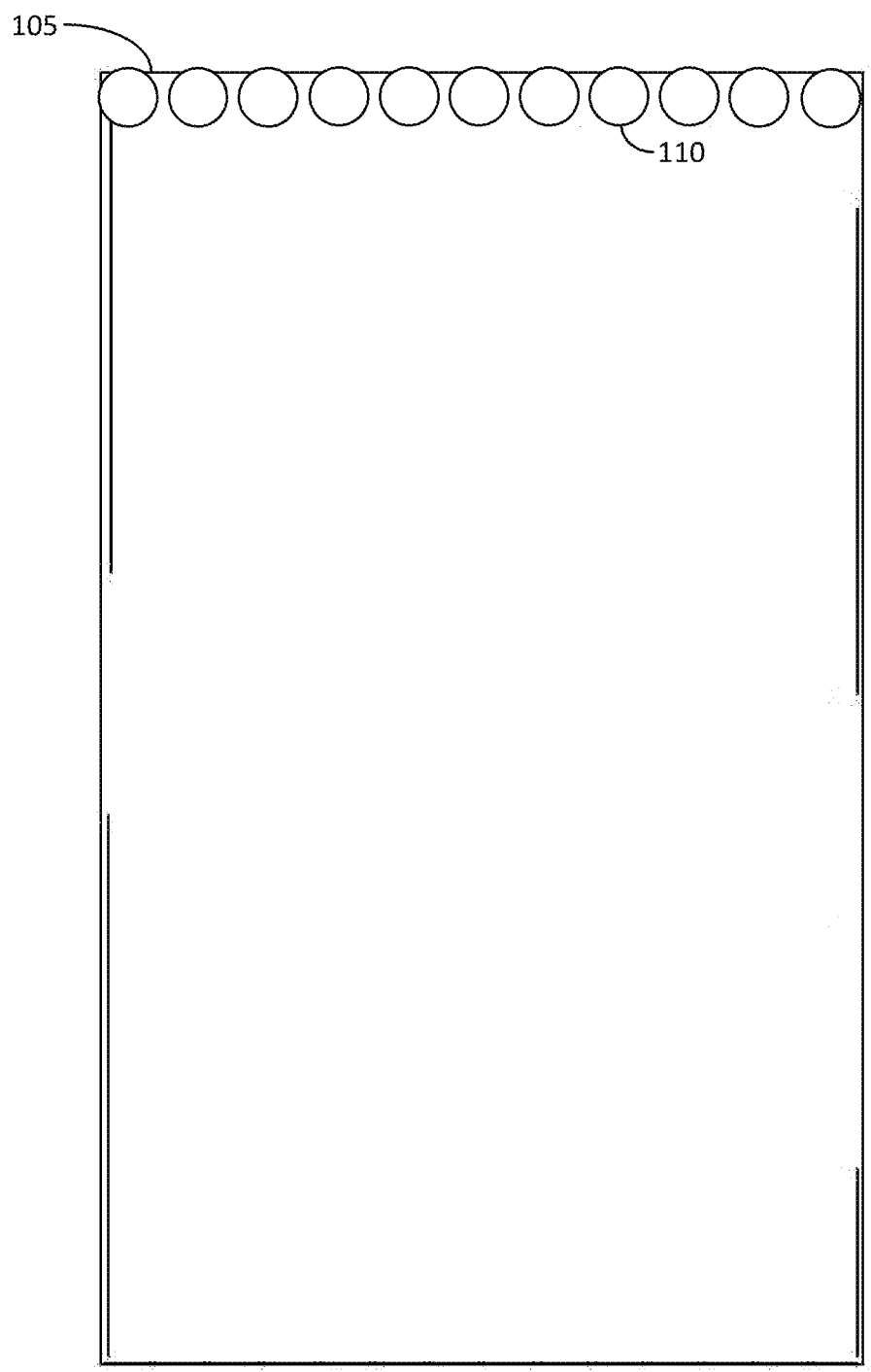
FIG. 2C illustrates a front view of another example vehicle washer brush panel in accordance with the some embodiments of the present inventive concept.
Figure 3A:
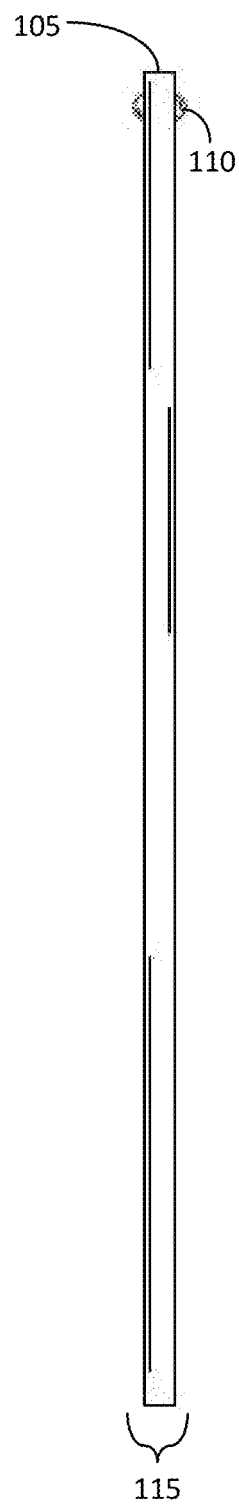
FIG. 3A illustrates a side view of the vehicle washer brush panel of FIG. 1A in accordance with the some embodiments of the present inventive concept.

FIG. 2A illustrates a front view of the vehicle washer brush panel 105 of FIG. 1A in accordance with the some embodiments of the present inventive concept. FIG. 2B illustrates a front view of the vehicle washer brush panel 105 of FIG. 1B in accordance with the some embodiments of the present inventive concept. FIG. 2C illustrates a front view of another example vehicle washer brush panel 105 in accordance with the some embodiments of the present inventive concept. FIG. 3A illustrates a side view of the vehicle washer brush panel 105 of FIG. 1A in accordance with the some embodiments of the present inventive concept.

Figure 3B:
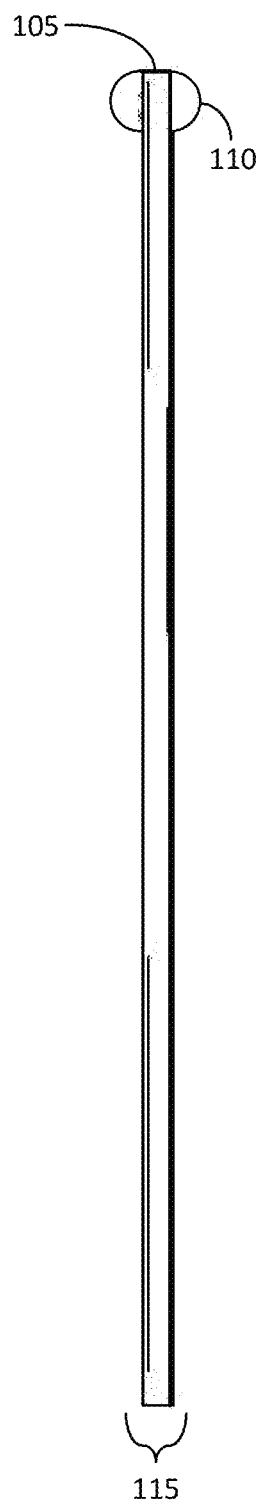
FIG. 3B illustrates a side view of the vehicle washer brush panel of FIG. 1B in accordance with the some embodiments of the present inventive concept.
Figure 4A:
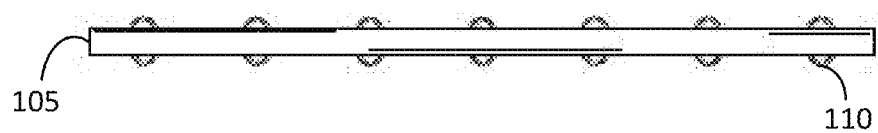
FIG. 4A illustrates a top view of the vehicle washer brush panel of FIG. 1A in accordance with the some embodiments of the present inventive concept.
Figure 5A:
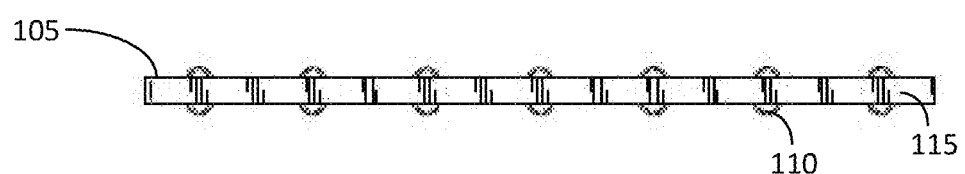
FIG. 5A illustrates a bottom view of the vehicle washer brush panel of FIG. 1A in accordance with the some embodiments of the present inventive concept.
Figure 4B:
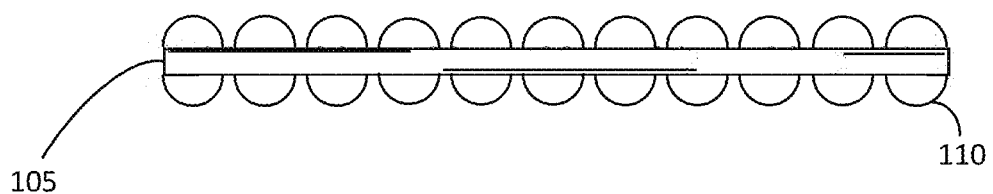
FIG. 4B illustrates a top view of the vehicle washer brush panel of FIG. 1B in accordance with the some embodiments of the present inventive concept.
Figure 5B:
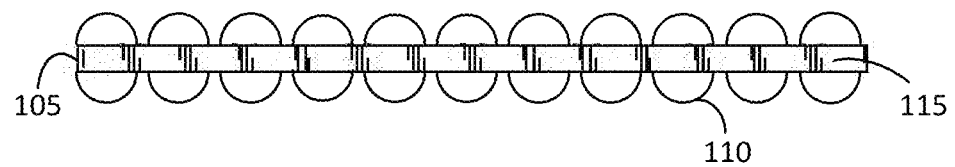
FIG. 5B illustrates a bottom view of the vehicle washer brush panel of FIG. 1B in accordance with the some embodiments of the present inventive concept.

FIG. 3B illustrates a side view of the vehicle washer brush panel 105 of FIG. 1B in accordance with the some embodiments of the present inventive concept. FIG. 4A illustrates a top view of the vehicle washer brush panel 105 of FIG. 1A in accordance with the some embodiments of the present inventive concept. FIG. 4B illustrates a top view of the vehicle washer brush panel 105 of FIG. 1B in accordance with the some embodiments of the present inventive concept. FIG. 5A illustrates a bottom view of the vehicle washer brush panel 105 of FIG. 1A in accordance with the some embodiments of the present inventive concept. FIG. 5B illustrates a bottom view of the vehicle washer brush panel 105 of FIG. 1B in accordance with the some embodiments of the present inventive concept.

It will be understood that the partially embedded nodules 110 can be of any suitable size and can be spaced apart at any suitable distance. In some embodiments, some of the partially embedded nodules 110 can be touching adjacent partially embedded nodules 110. In some embodiments, the larger partially embedded nodules 110 as shown in FIGS. 2B, 3B, 4B, and 5B provide better support of the vehicle washer brush panel 105 to reduce or eliminate sagging of the vehicle washer brush panel 105 when the vehicle washer brush panel 105 is wet.

As shown in FIG. 2C, the vehicle washer brush panel 105 need not include fingers 115. In other words, in some embodiments, the vehicle washer brush panels 105 disclosed herein can be made of substantially a whole contiguous rectangular vehicle washer brush panel 105, with the embedded nodules 110 disposed along one edge thereof.

Figure 6:
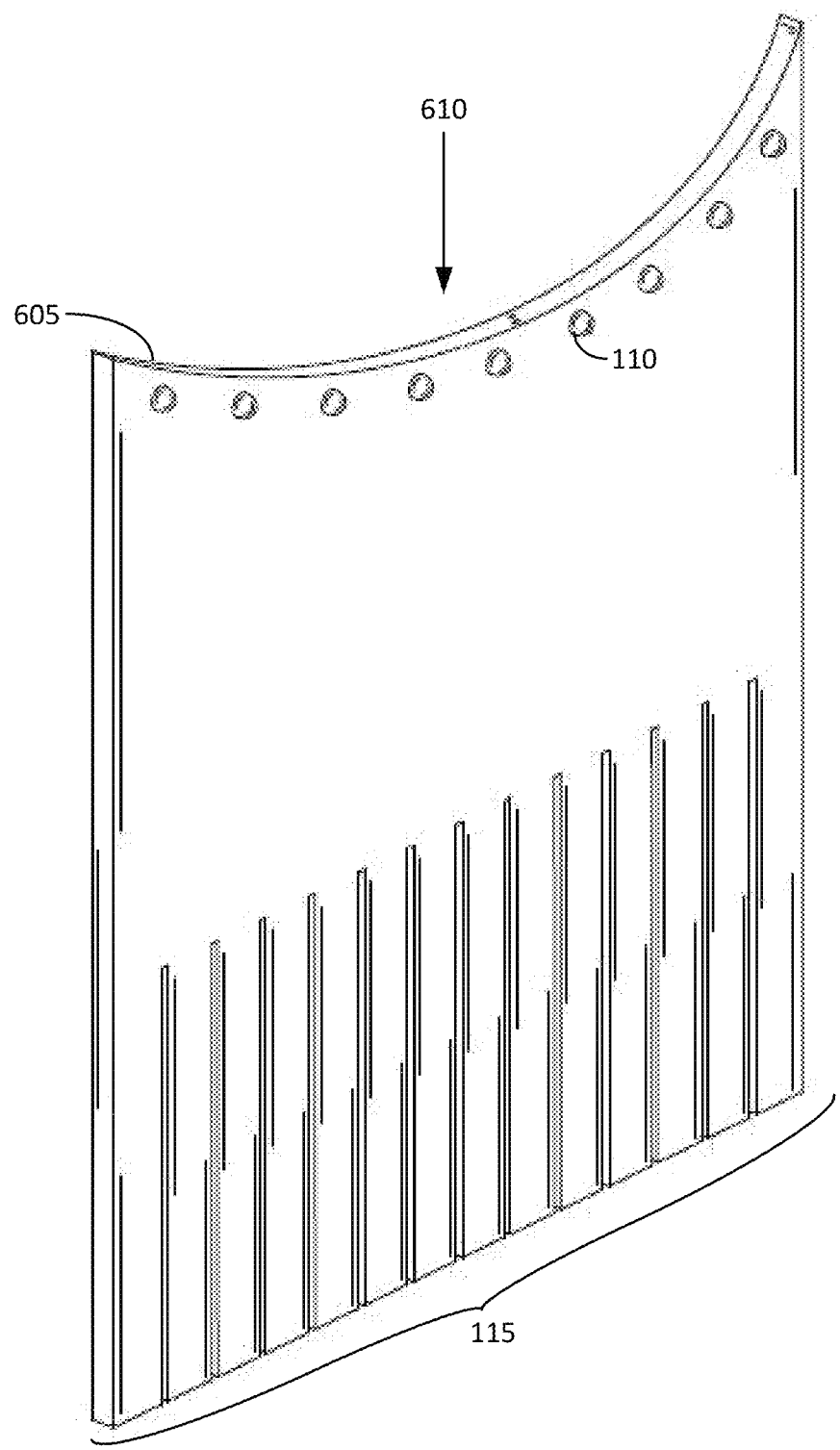
FIG. 6 illustrates a perspective view of vehicle washer brush panel with partially embedded nodules in accordance with some embodiments of the present inventive concept.

FIG. 6 illustrates a perspective view of vehicle washer brush panel 605 with partially embedded nodules 110 in accordance with some embodiments of the present inventive concept. The vehicle washer brush panel 605 shares some of the elements of the vehicle washer brush panel 105 of FIG. 1A, and therefore, a detailed description of such elements is not necessarily repeated. Of particular note, the vehicle washer brush panel 605 includes an arcuate edge 610. The partially embedded nodules 110 and corresponding holes can be arranged in a substantially arcuate formation along and near the arcuate edge 610. The vehicle washer brush panel 605 is suitable to be inserted and extracted from a hub having slanted slots, as further described below.

Figure 7:
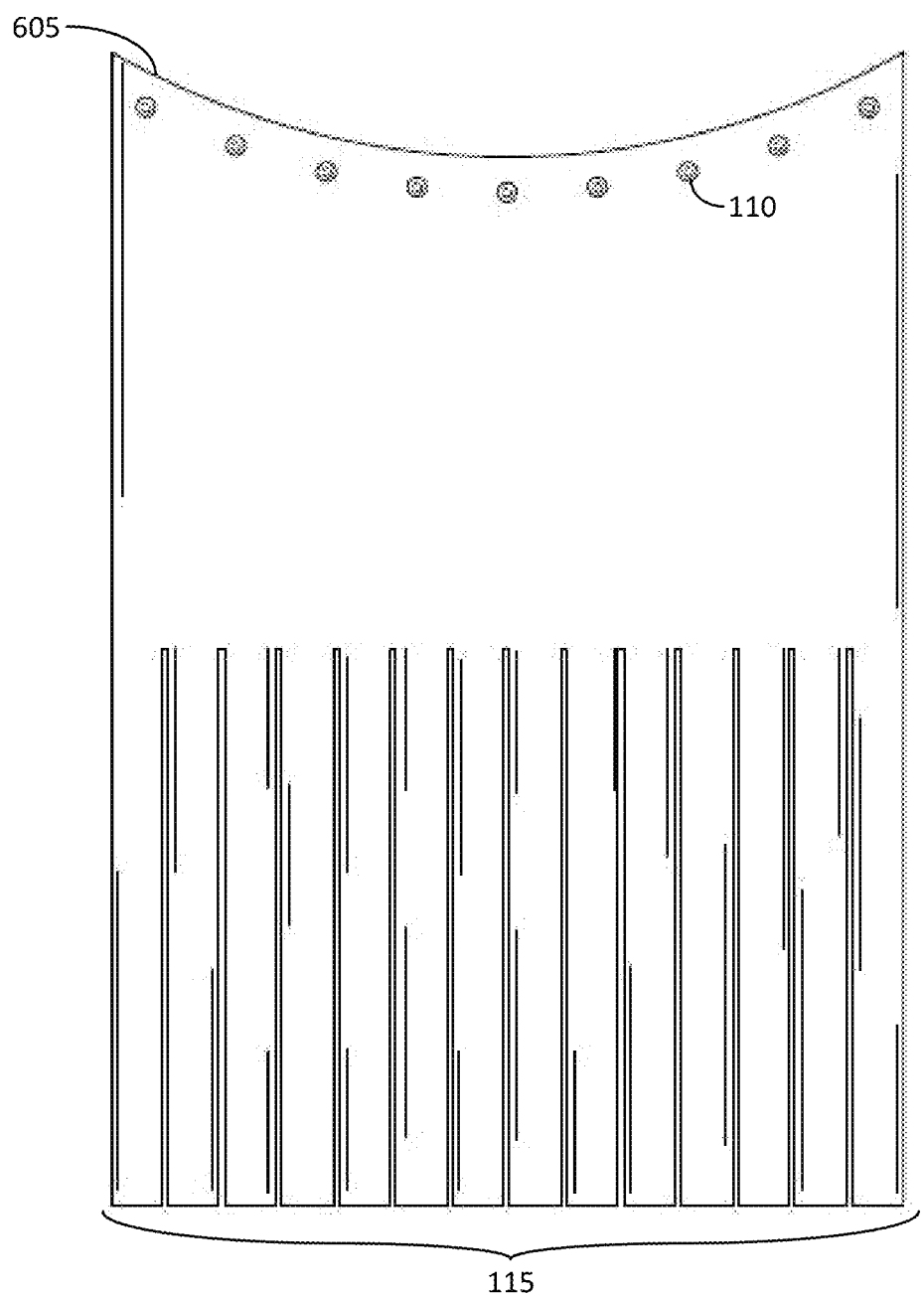
FIG. 7 illustrates a front view of the vehicle washer brush panel of FIG. 6 in accordance with some embodiments of the present inventive concept.
Figure 8:
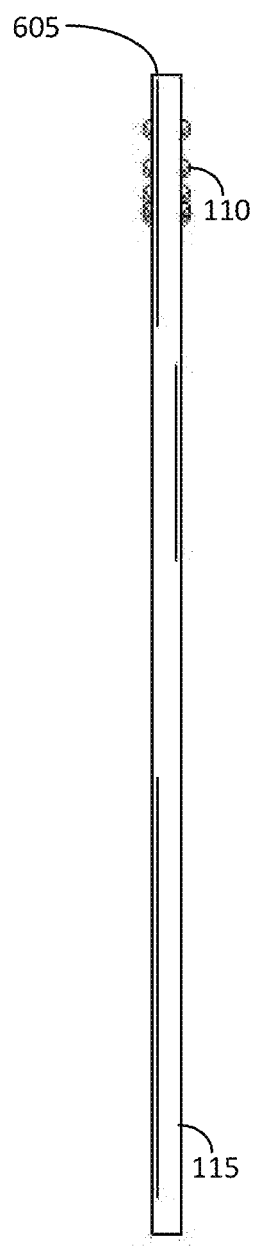
FIG. 8 illustrates a side view of the vehicle washer brush panel of FIG. 6 in accordance with some embodiments of the present inventive concept.
Figure 9:
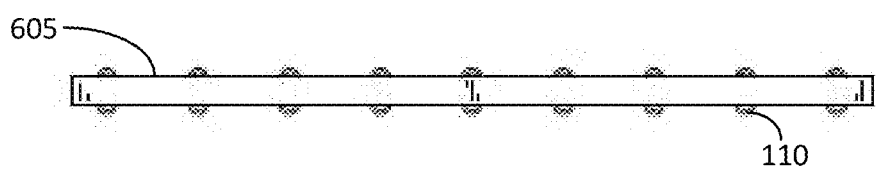
FIG. 9 illustrates a top view of the vehicle washer brush panel of FIG. 6 in accordance with some embodiments of the present inventive concept.
Figure 10:
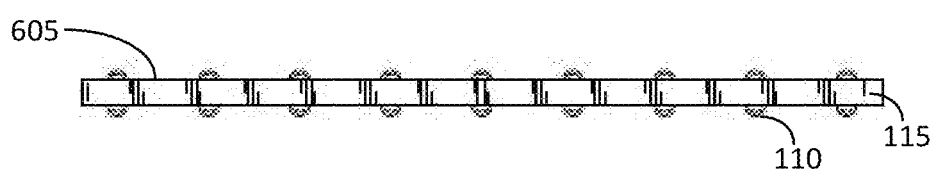
FIG. 10 illustrates a bottom view of the vehicle washer brush panel of FIG. 6 in accordance with some embodiments of the present inventive concept.

FIG. 7 illustrates a front view of the vehicle washer brush panel 605 of FIG. 6 in accordance with some embodiments of the present inventive concept. FIG. 8 illustrates a side view of the vehicle washer brush panel 605 of FIG. 6 in accordance with the some embodiments of the present inventive concept. FIG. 9 illustrates a top view of the vehicle washer brush panel 605 of FIG. 6 in accordance with the some embodiments of the present inventive concept. FIG. 10 illustrates a bottom view of the vehicle washer brush panel 605 of FIG. 6 in accordance with some embodiments of the present inventive concept.

Figure 11:
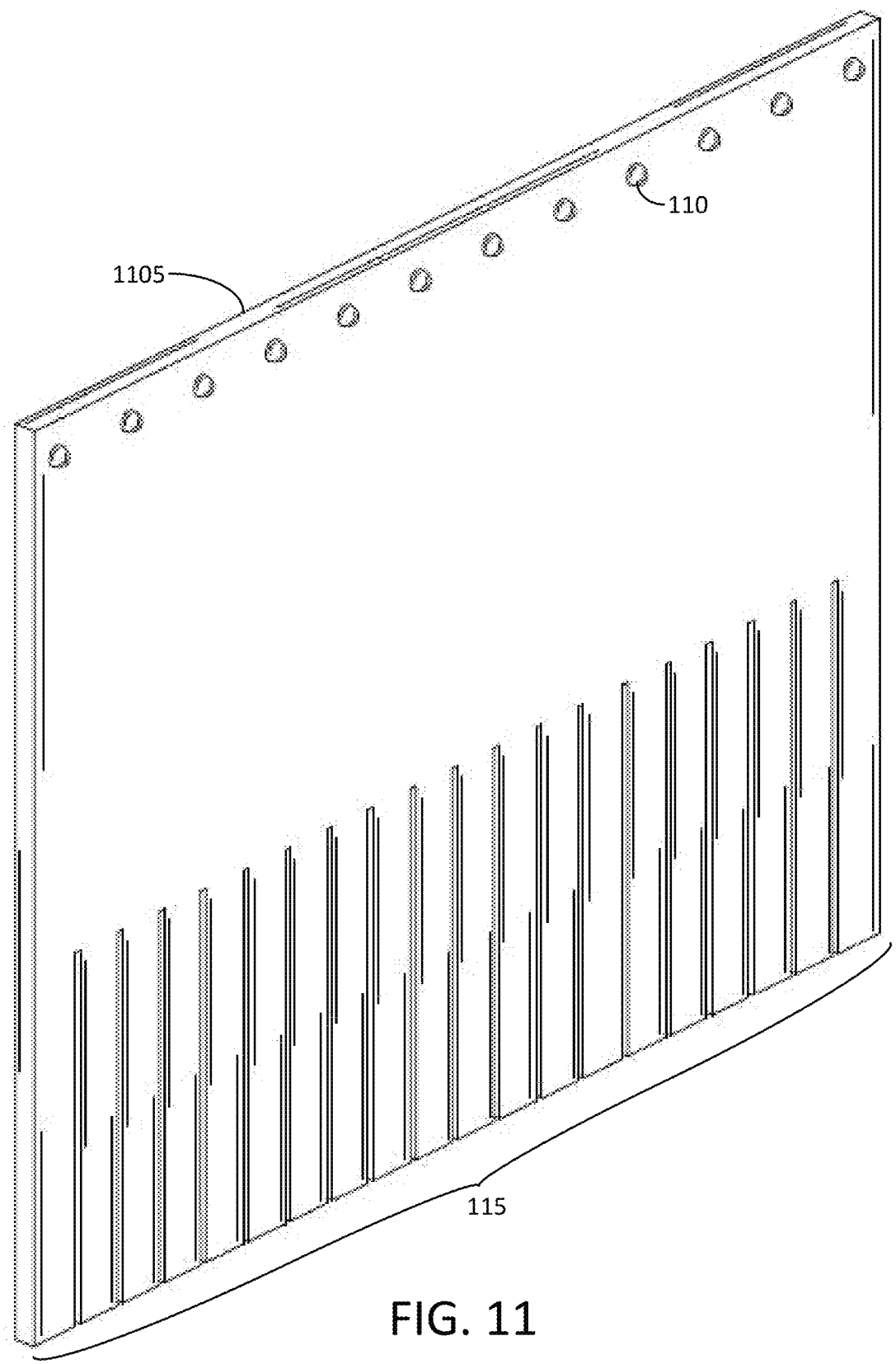
FIG. 11 illustrates a perspective view of vehicle washer brush panel with partially embedded nodules in accordance with some embodiments of the present inventive concept.

FIG. 11 illustrates a perspective view of vehicle washer brush panel 1105 with partially embedded nodules 110 in accordance with some embodiments of the present inventive concept. The vehicle washer brush panel 1105 shares some of the elements of the vehicle washer brush panel 105 of FIG. 1A, and therefore, a detailed description of such elements is not necessarily repeated. Of particular note, the vehicle washer brush panel 605 is wider than the vehicle washer brush panel 105 of FIG. 1A. It will be understood that any suitable width and length of vehicle washer brush panels can be used without departing from the inventive concepts disclosed herein. The vehicle washer brush panel 1105, like the vehicle washer brush panel 105, is suitable to be inserted and extracted from a hub having straight or vertical slots, as further described below.

Figure 12:
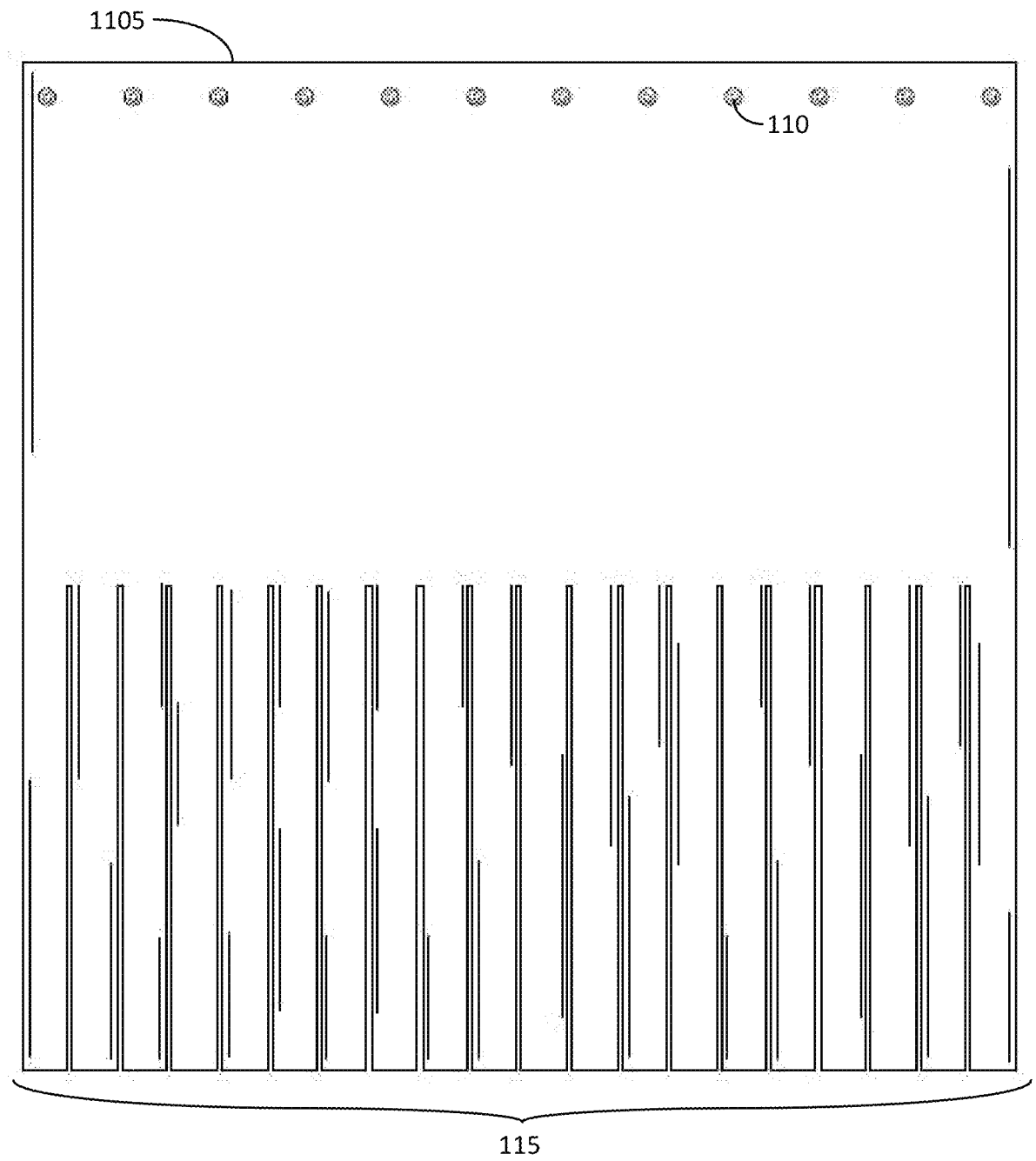
FIG. 12 illustrates a front view of the vehicle washer brush panel of FIG. 11 in accordance with some embodiments of the present inventive concept.
Figure 13:
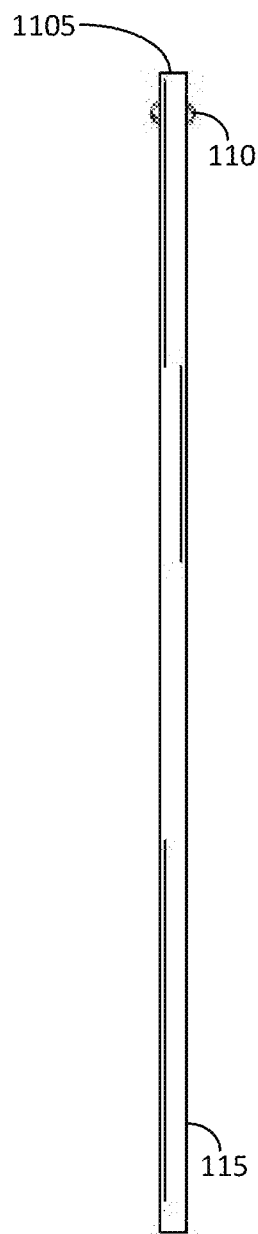
FIG. 13 illustrates a side view of the vehicle washer brush panel of FIG. 11 in accordance with some embodiments of the present inventive concept.
Figure 14:
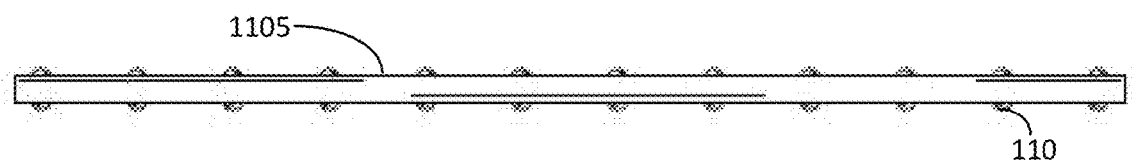
FIG. 14 illustrates a top view of the vehicle washer brush panel of FIG. 11 in accordance with some embodiments of the present inventive concept.
Figure 15:
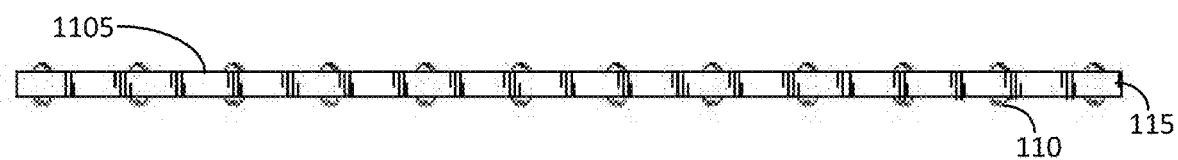
FIG. 15 illustrates a bottom view of the vehicle washer brush panel of FIG. 11 in accordance with some embodiments of the present inventive concept.

FIG. 12 illustrates a front view of the vehicle washer brush panel 1105 of FIG. 11 in accordance with some embodiments of the present inventive concept. FIG. 13 illustrates a side view of the vehicle washer brush panel 1105 of FIG. 11 in accordance with some embodiments of the present inventive concept. FIG. 14 illustrates a top view of the vehicle washer brush panel 1105 of FIG. 11 in accordance with some embodiments of the present inventive concept. FIG. 15 illustrates a bottom view of the vehicle washer brush panel 1105 of FIG. 11 in accordance with some embodiments of the present inventive concept.

Figure 16:
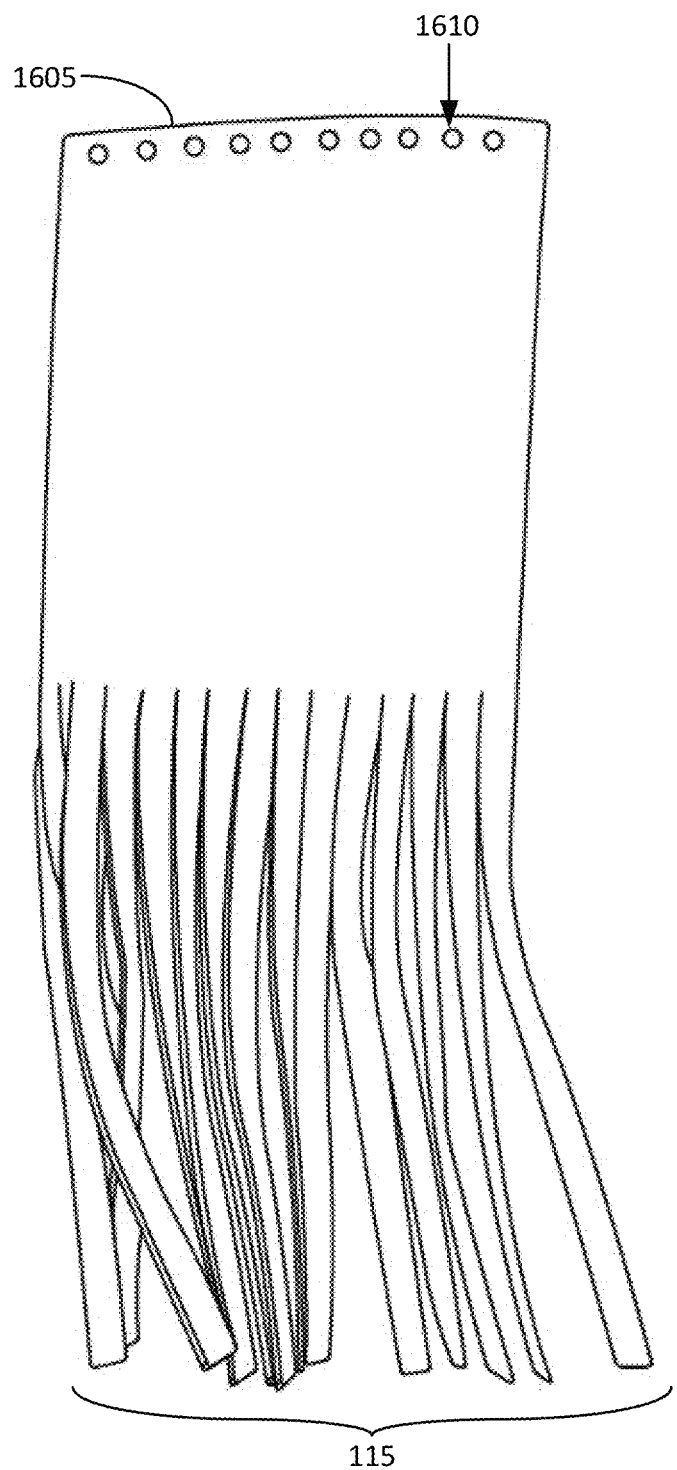
FIG. 16 illustrates a vehicle washer brush panel with holes prior to formation of the nodules in accordance with some embodiments of the present inventive concept.

FIG. 16 illustrates a vehicle washer brush panel 1605 with holes 1610 prior to formation of the nodules 110 in accordance with some embodiments of the present inventive concept. The holes 1610 may be punched, burned, or otherwise cut through the cloth material of the vehicle washer brush panel 1605. The holes 1610 can be disposed along an edge of the vehicle washer brush panel 1605.

Figure 17:
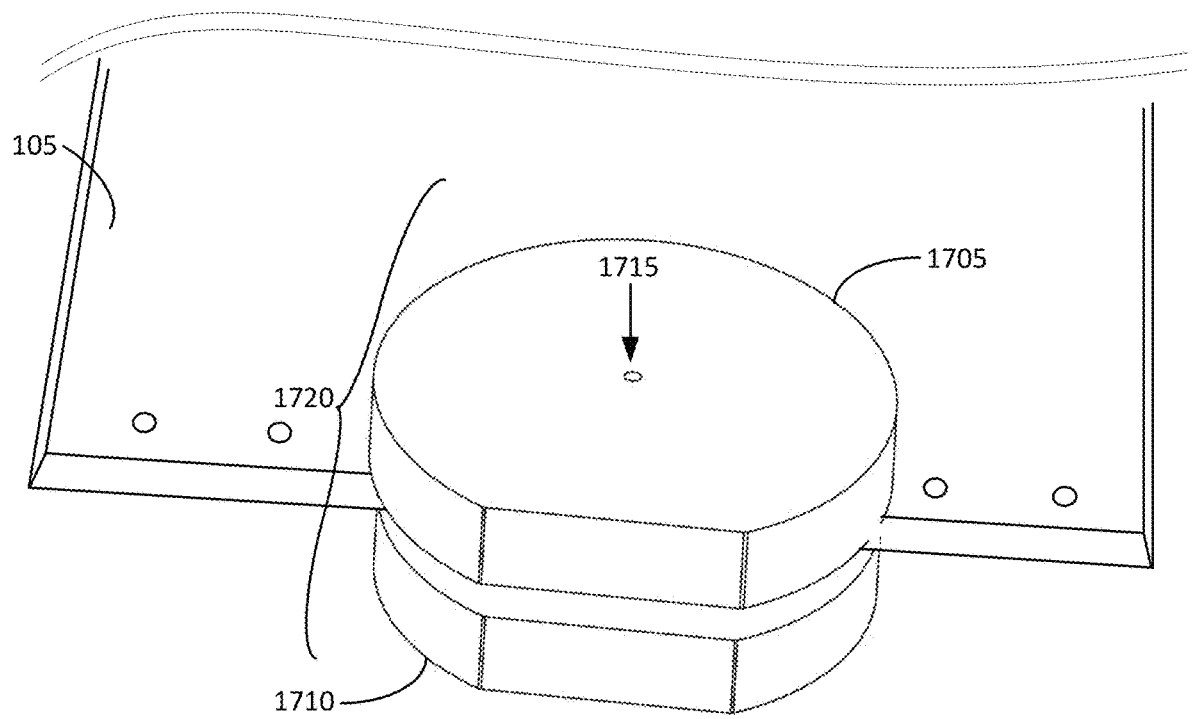
FIG. 17 illustrates an upper section and a lower section of a die with a vehicle washer brush panel disposed therebetween in accordance with some embodiments of the present inventive concept.

FIG. 17 illustrates an upper section 1705 and a lower section 1710 of a die 1720 with a vehicle washer brush panel 105 disposed therebetween in accordance with some embodiments of the present inventive concept. The die 1720 can include an injection orifice 1715 that travels through the upper section 1705 of the die 1720. The injection orifice 1715 can be aligned with a hole (e.g., 1610 of FIG. 16) of the vehicle washer brush panel 105. An injection material such as nylon, polypro, plastic, hotmelt, or any suitable injection material can be injected into the injection orifice 1715 while the injection material is in a softened state. Thereafter, the injection material can be left for a period of time to be hardened while confined within a mold cavity of the die 1720, as shown in FIG. 18.

Figure 18:
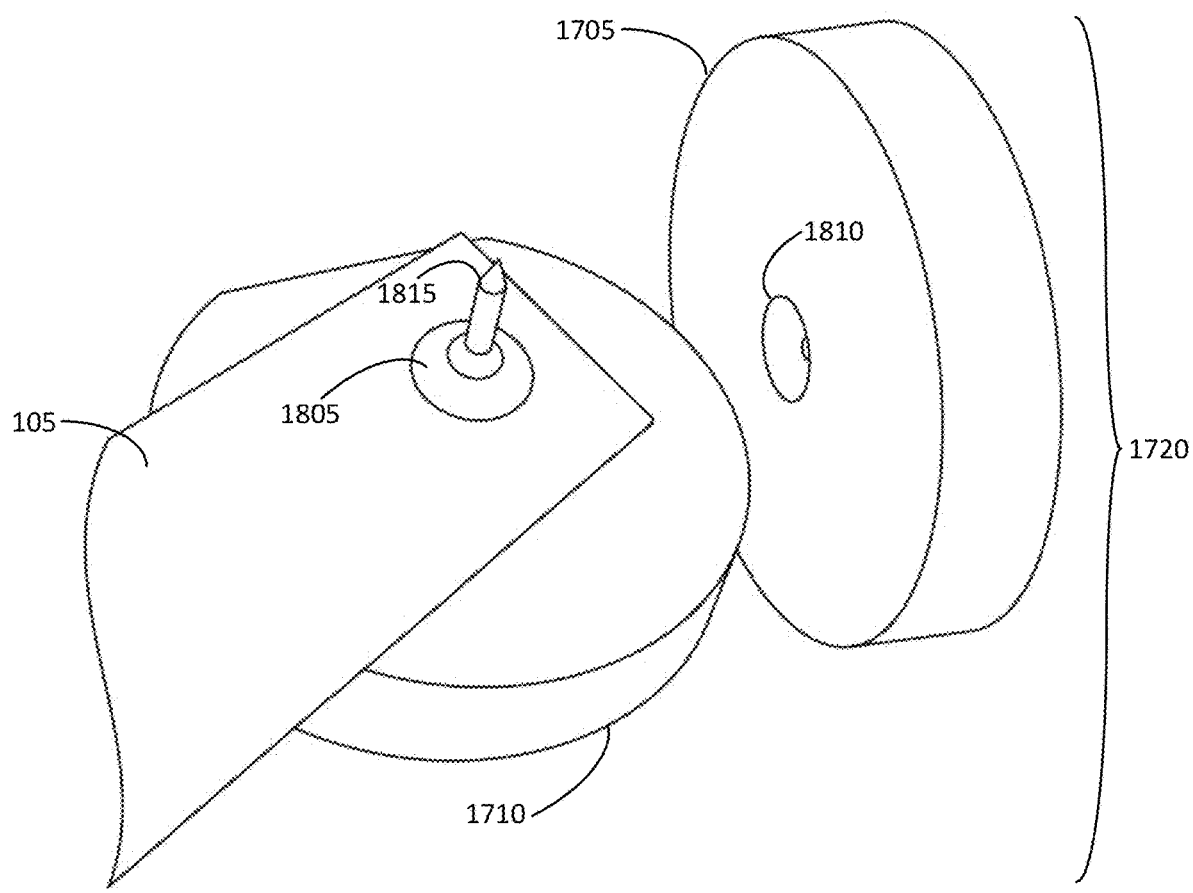
FIG. 18 illustrates a partially embedded nodule in accordance with some embodiments of the present inventive concept.

FIG. 18 illustrates a partially embedded nodule 1805 in accordance with some embodiments of the present inventive concept. After the injection material has sufficiently hardened within a mold cavity 1810 of the die 1720, the upper section 1705 of the die 1720 can be lifted off of the lower section 1710 of the die 1720. This reveals the hardened nodule 1805, which in this state, still includes a hardened extrusion 1815 formed as a result of material present within a channel of the injection orifice 1715. The hardened extrusion 1815 may be cut from or otherwise removed from the hardened nodule 1805, leaving a partially embedded nodule 1805 having rounded faces on either side thereof. The hardened injection material can extend through the hole (e.g., 1610 of FIG. 16) of the vehicle washer brush panel 105, thus securely affixing the hardened nodule 1805 to the vehicle washer brush panel 105.

It will be understood that even though a single die is shown herein, multiple dies can be used at once. In some embodiments, a single contiguous die with multiple injection orifices can cause multiple nodules to be mold-injected simultaneously. Accordingly, an entire vehicle washer brush panel can have all of its nodules formed substantially at the same time, which decreases the time to produce a single vehicle washer brush panel, and increases the manufacturing efficiency.

It will be understood that even though a single die is shown herein, multiple dies can be used at once. In some embodiments, a single contiguous die with multiple injection orifices can cause multiple nodules to be mold-injected simultaneously. Accordingly, an entire vehicle washer brush panel can have all of its nodules formed substantially at the same time, which decreases the time to produce a single vehicle washer brush panel, and increases the manufacturing efficiency.

Figure 19:
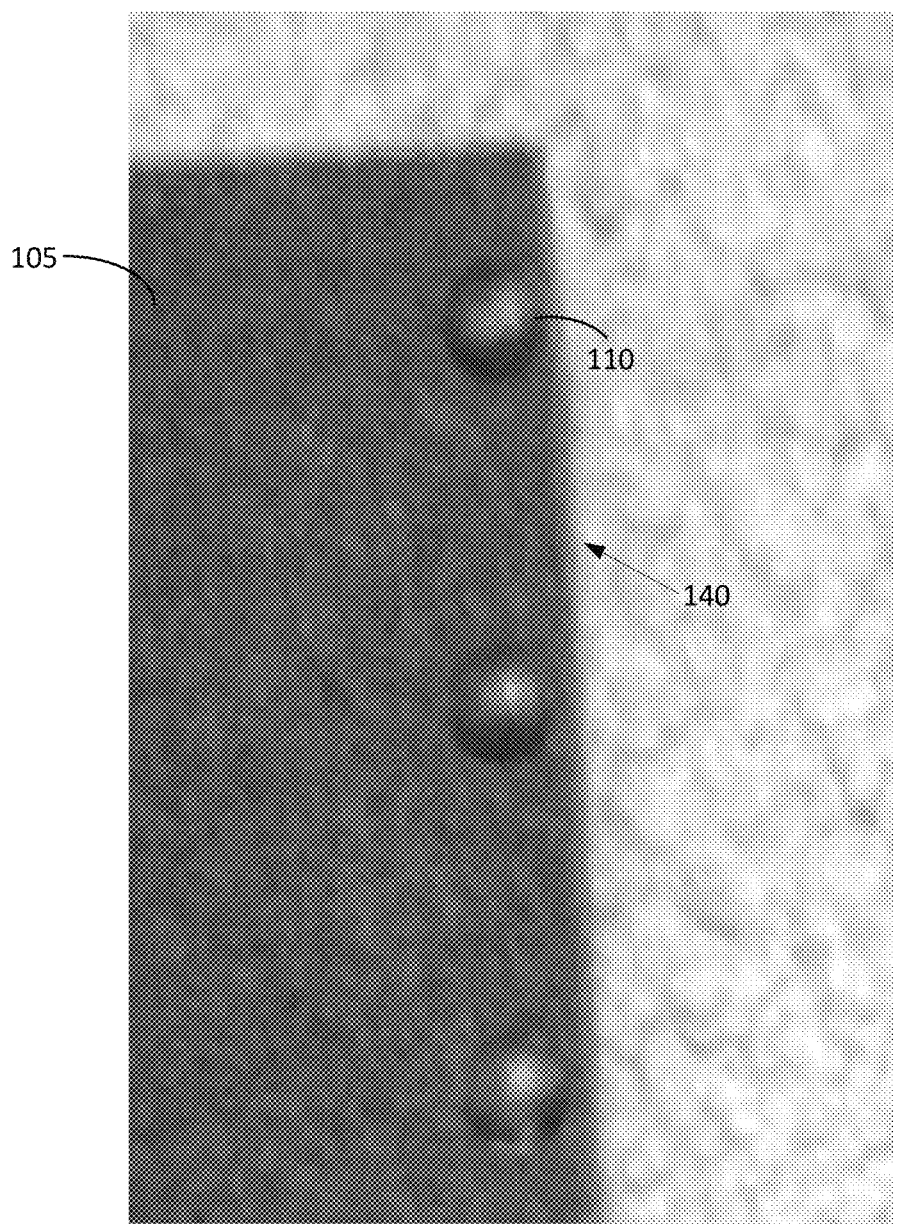
FIG. 19 illustrates a section of a vehicle washer brush panel with multiple completed partially embedded nodules in accordance with some embodiments of the present inventive concept.

FIG. 19 illustrates a section of a vehicle washer brush panel 105 with multiple completed partially embedded nodules 110 in accordance with some embodiments of the present inventive concept. In the finished state, the vehicle washer brush panel 105 can include multiple hardened partially embedded nodules 110 securely affixed to the vehicle washer brush panel 105 along an edge 140 thereof.

Figure 20:
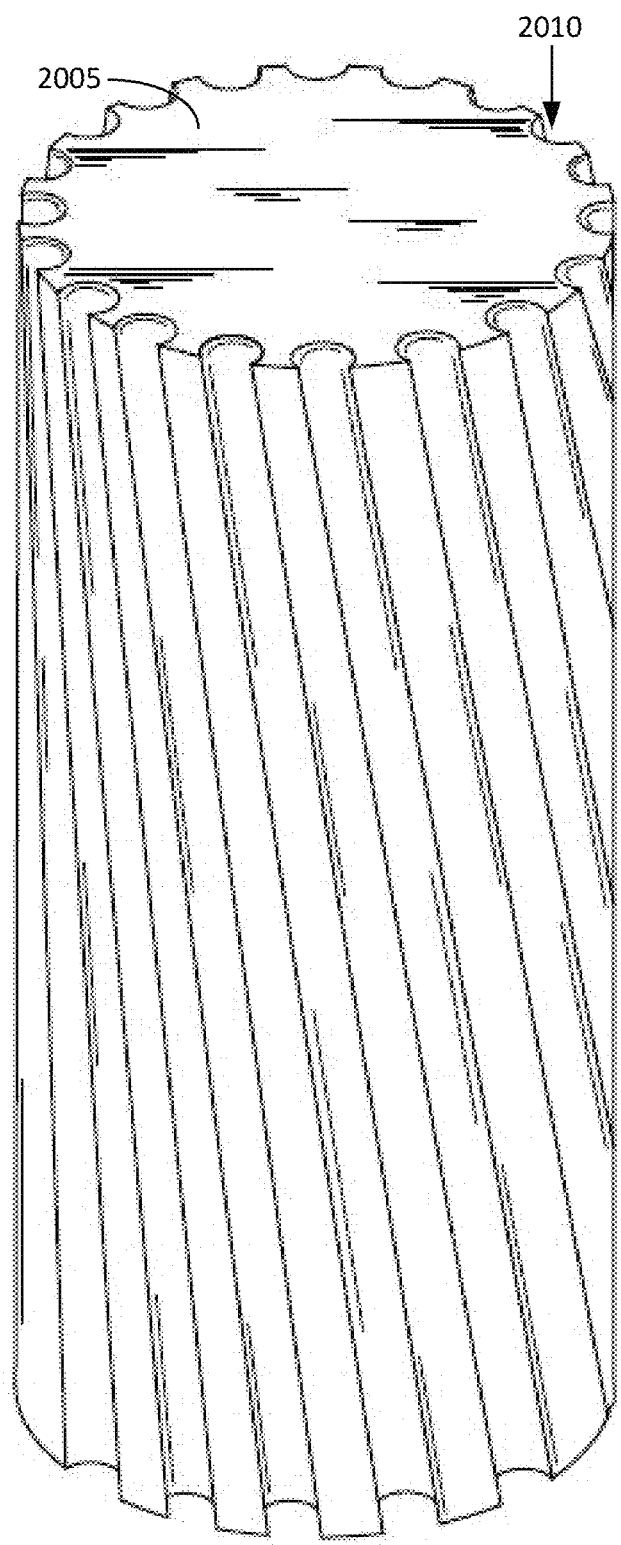
FIG. 20 illustrates a core with slanted slots in which the completed vehicle washer brush panels with partially embedded nodules can slide in and out of in accordance with some embodiments of the present inventive concept.

FIG. 20 illustrates a core 2005 with slanted slots 2010 in which the completed vehicle washer brush panels (e.g., 605 of FIG. 6) with partially embedded nodules (e.g., 110 of FIG. 6) can slide into and out of in accordance with some embodiments of the present inventive concept. The vehicle washer brush panels 605 can be inserted into and extracted from the core 2005 with ease, even after an extended period of time, and even if the core 2005 has become corroded with use and time. The arcuate edge 610 of the vehicle washer brush panel 605 permits the vehicle washer brush panel 605 to fit securely within the slanted 2010 of the core 2005.

Figure 21:
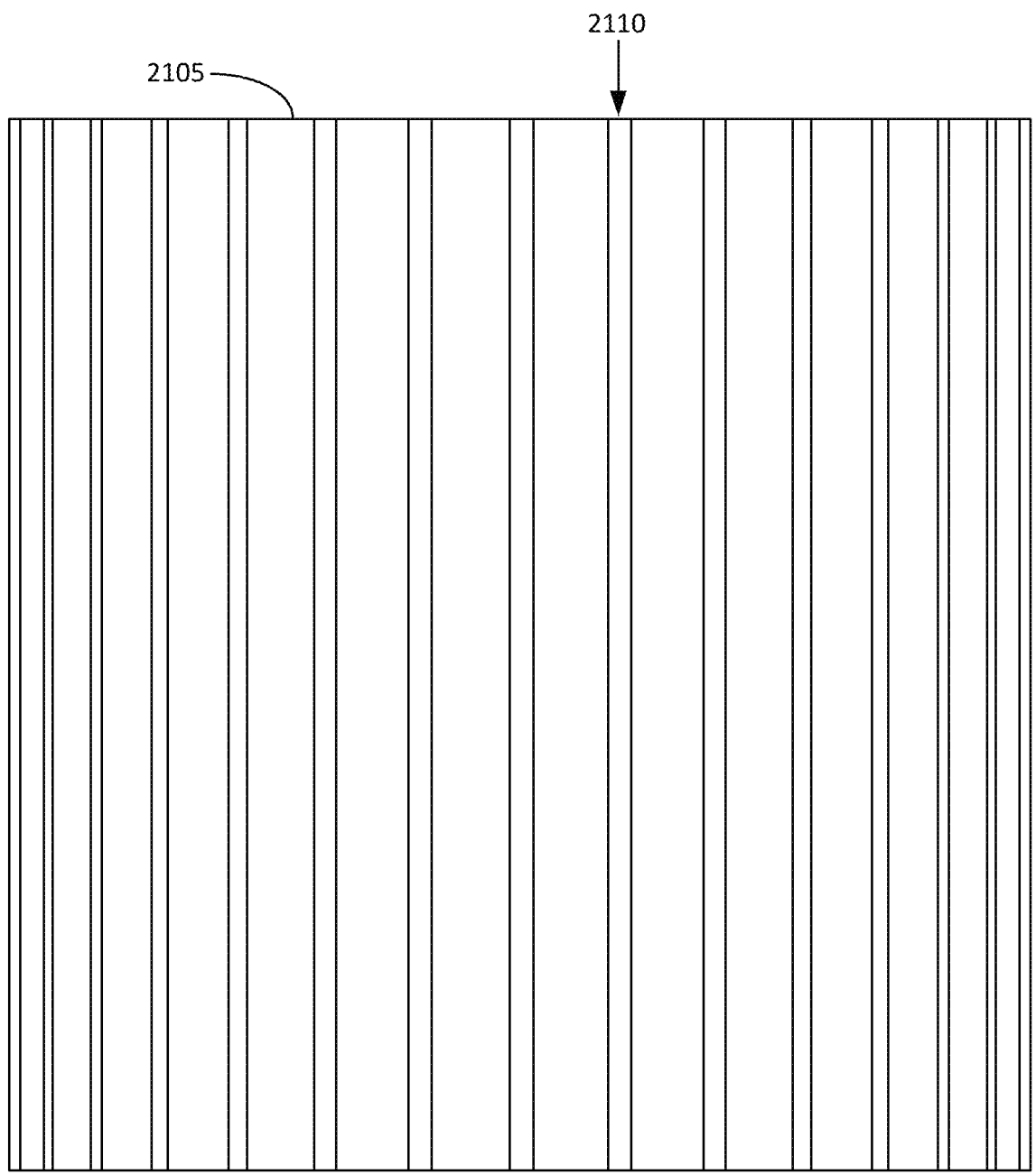
FIG. 21 illustrates a core with vertical slots in which the completed vehicle washer brush panels with partially embedded nodules can slide in and out of in accordance with some embodiments of the present inventive concept.

FIG. 21 illustrates a core 2105 with vertical slots 2110 in which the completed vehicle washer brush panels (e.g., 105 of FIG. 1A) with partially embedded nodules (e.g., 110 of FIG. 1A) can slide in and out of in accordance with some embodiments of the present inventive concept. The vehicle washer brush panels 105 can be inserted into and extracted from the core 2105 with ease, even after an extended period of time, and even if the core 2105 has become corroded with use and time. The straight edge 140 of the vehicle washer brush panel 105 permits the vehicle washer brush panel 105 to fit securely within the vertical slots 2110 of the core 2105. It will be understood that other vehicle washer brush panels such as 1105 of FIG. 11 can be slid into and out of the core 2105.

Figure 22:
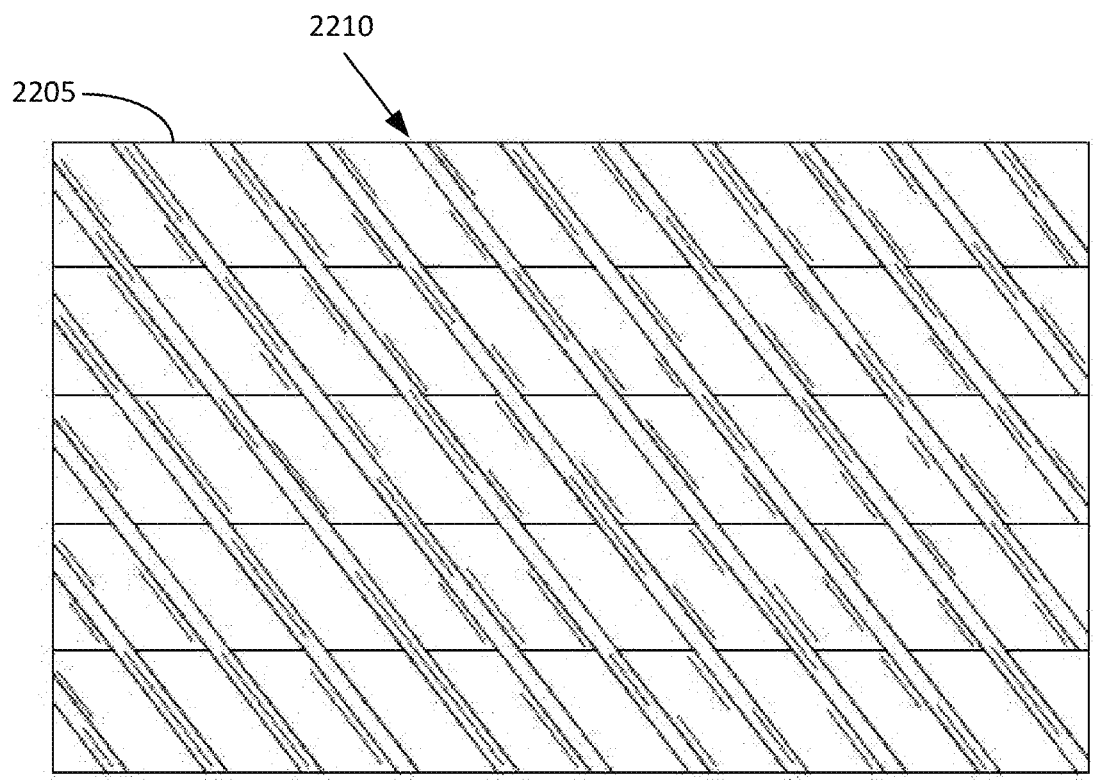
FIG. 22 illustrates a multi-section core with slanted slots in which the completed vehicle washer brush panels with partially embedded nodules can slide in and out of in accordance with some embodiments of the present inventive concept.

FIG. 22 illustrates a multi-section core 2205 with slanted slots 2210 in which the completed vehicle washer brush panels (e.g., 605 of FIG. 6) with partially embedded nodules (e.g., 110 of FIG. 6) can slide in and out of in accordance with some embodiments of the present inventive concept. The vehicle washer brush panels 605 can be inserted into and extracted from the multi-section core 2205 with ease, even after an extended period of time, and even if the core 2205 has become corroded with use and time. The arcuate edge 610 of the vehicle washer brush panel 605 permits the vehicle washer brush panel 605 to fit securely within the slanted slots 2210 of the multi-section core 2205.

Figure 23:
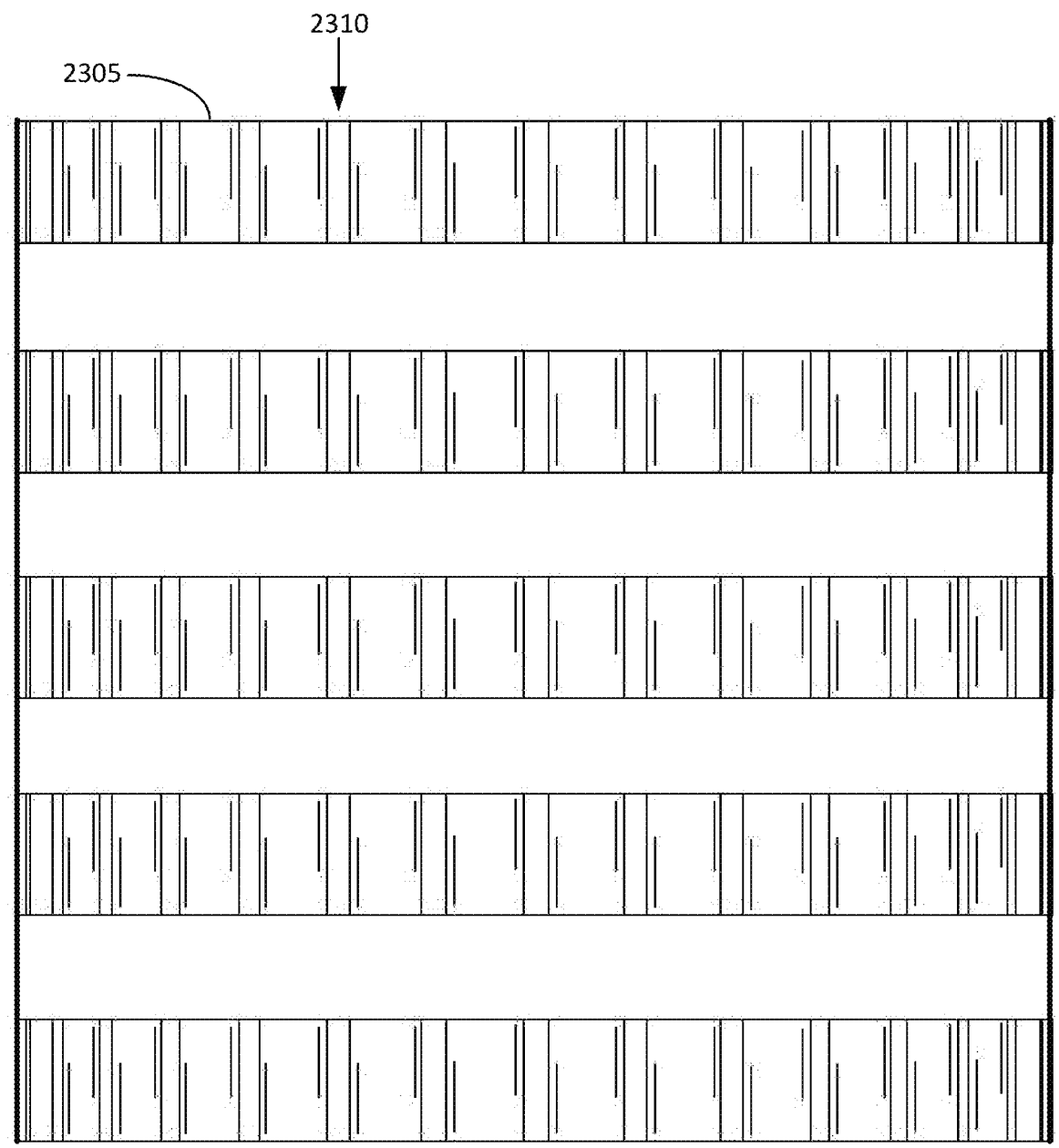
FIG. 23 illustrates a multi-section core with vertical slots in which the completed vehicle washer brush panels with partially embedded nodules can slide in and out of in accordance with some embodiments of the present inventive concept.

FIG. 23 illustrates a multi-section core 2305 with vertical slots 2310 in which the completed vehicle washer brush panels (e.g., 105 of FIG. 1A) with partially embedded nodules (e.g., 110 of FIG. 1A) can slide in and out of in accordance with some embodiments of the present inventive concept. The vehicle washer brush panels 105 can be inserted into and extracted from the core 2305 with ease, even after an extended period of time, and even if the core 2305 has become corroded with use and time. The straight edge 140 of the vehicle washer brush panel 105 permits the vehicle washer brush panel 105 to fit securely within the vertical slots 2310 of the core 2305. It will be understood that other vehicle washer brush panels such as 1105 of FIG. 11 can be slid into and out of the core 2305.

Figure 24:
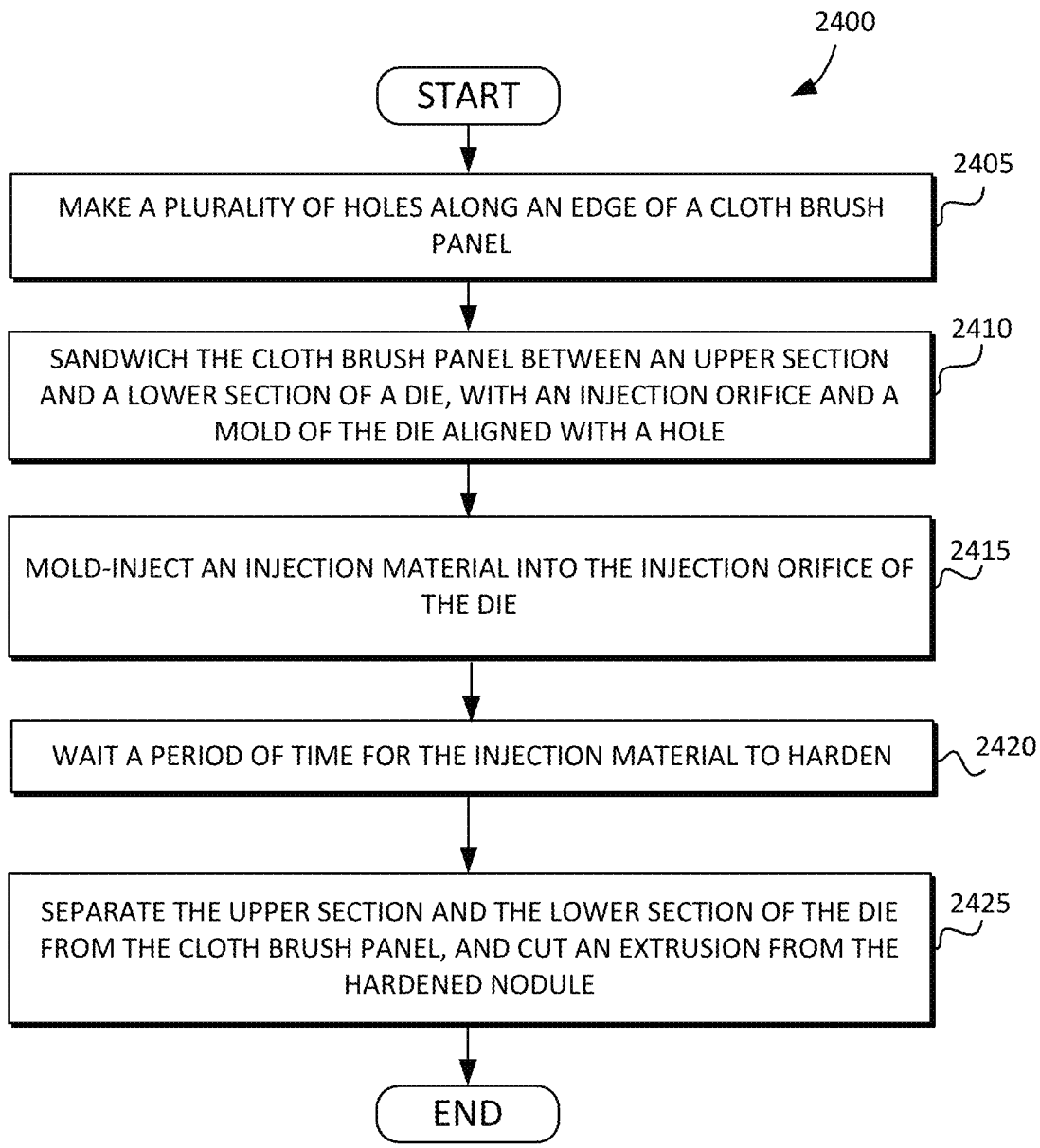
FIG. 24 illustrates a flow diagram in accordance with some embodiments of the present inventive concept.

FIG. 24 illustrates a flow diagram 2400 in accordance with some embodiments of the present inventive concept. The flow diagram 2400 includes a method of manufacturing the vehicle washer brush panels disclosed herein. At 2405, a plurality of holes can be made along an edge of a cloth brush panel. At 2410, the cloth brush panel can be sandwiched between an upper section and a lower section of a die, with an injection orifice and a mold of the die aligned with one of the holes. At 2415, an injection material can be mold-injected into an injection orifice of the die. At 2420, a period of time can pass so that the injection material has a chance to harden. At 2425, the upper section and the lower section of the die can be separated from the cloth brush panel, and an extrusion cut from the hardened nodule, such that the hardened nodule includes rounded faces on either side thereof.

In some embodiments, a method for manufacturing a vehicle washer brush panel includes creating a hole (e.g., 150 of FIG. 1A) near an edge of a cloth brush panel (e.g., 105 of FIG. 1A). The method may include sandwiching the cloth brush panel (e.g., 105 of FIG. 1A) between an upper section (e.g., 1705 of FIG. 17) and a lower section (e.g., 1710 of FIG. 17) of a die (e.g., 1720 of FIG. 17). The method may include aligning a mold cavity (e.g., 1810 of FIG. 18) of the die (e.g., 1720 of FIG. 17) with the hole (e.g., 150 of FIG. 1A). The method can include mold-injecting an injection material through an injection orifice (e.g., 1715 of FIG. 17) of the die (e.g., 1720) so that the injection material fills the hole (e.g., 150 of FIG. 1A) in the cloth brush panel (e.g., 105 of FIG. 1A) and the mold cavity (e.g., 1810) of the die (e.g., 1720). The method may include waiting a predefined period of time for the injection material to harden into a partially embedded hardened nodule (e.g., 110 of FIG. 1A). The method may include separating the upper section (e.g., 1705 of FIG. 17) and the lower section (e.g., 1710 of FIG. 17) of the die (e.g., 1720 of FIG. 17) from the cloth brush panel (e.g., 105 of FIG. 1A). The method can include cutting a hardened extrusion (e.g., 1815) left from the injection orifice (e.g., 1715 of FIG. 17) from the partially embedded hardened nodule (e.g., 1805 of FIG. 18 and 110 of FIG. 1A).

In some embodiments, the method can include creating multiple holes (e.g., 1610 of FIG. 16) near the edge of the cloth brush panel. In some embodiments, the die (e.g., 1720 of FIG. 17) can include multiple mold cavities (e.g., 1810 of FIG. 18). The method may include aligning the multiple mold cavities (e.g., 1810 of FIG. 18) of the die (e.g., 1720 of FIG. 17) with the holes (e.g., 1610 of FIG. 16). The method may include mold-injecting an injection material through the injection orifices (e.g., 1715 of FIG. 17) of the die (e.g., 1720 of FIG. 17) so that the injection material fills the holes (e.g., 1610 of FIG. 16) in the cloth brush panel (e.g., 105 of FIG. 1A) and the mold cavities (e.g., 1810 of FIG. 18) of the die (e.g., 1720 of FIG. 17).

Figure 25:
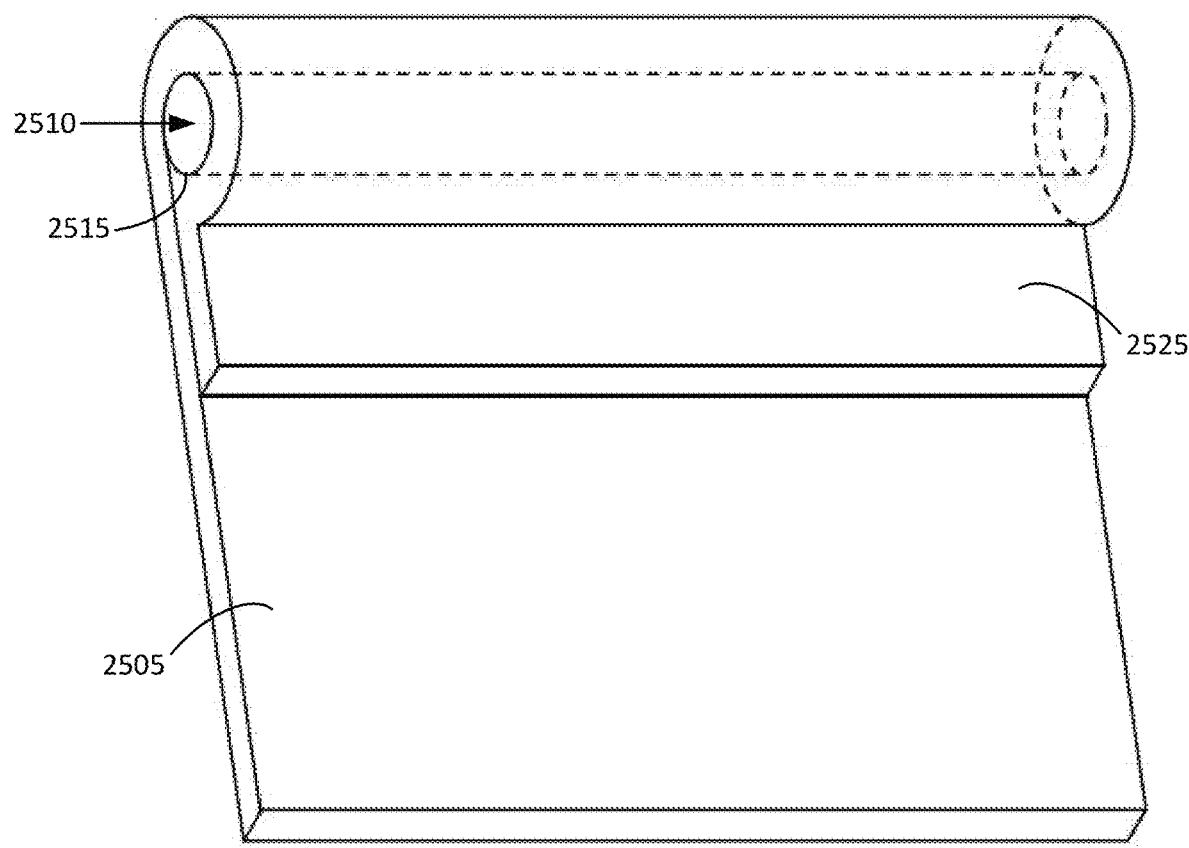
FIG. 25 illustrates an example perspective view of a vehicle washer brush panel with an embedded rod disposed within a shaft of a folded section of the brush panel in accordance with some embodiments of the present inventive concept.
Figure 26:
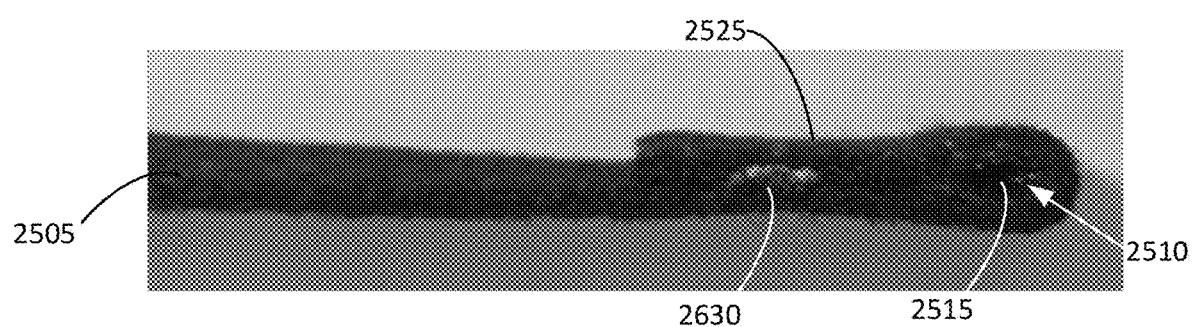
FIG. 26 illustrates another example perspective view of the vehicle washer brush panel with the embedded rod disposed within the shaft of the folded section of the brush panel in accordance with some embodiments of the present inventive concept.

FIG. 25 illustrates an example perspective view of a vehicle washer brush panel 2505 with an embedded rod 2515 of hardened material disposed within a shaft 2510 of a folded section 2525 of the brush panel 2505 in accordance with some embodiments of the present inventive concept. FIG. 26 illustrates another example perspective view of the vehicle washer brush panel 2505 with the embedded rod 2515 of hardened material disposed within the shaft 2510 of the folded section 2525 of the brush panel 2505 in accordance with some embodiments of the present inventive concept. Reference is now made to FIGS. 25 and 26.

The rod 2515 of hardened material nylon, polypro, plastic, a hotmelt, or any suitable material substance can be mold-injected into the channel 2510. The injection material may be soft at the time of injection into the channel 2510, and then may harden over a period of time. The folded section 2525 of the brush panel 2505 can be securely affixed to the brush panel 2505 using an adhesive 2630, as shown in FIG. 26. In some embodiments, the adhesive 2630 is the same material as the injection material. It will be understood that the adhesive can be any suitable, durable and long-lasting adhesive. After the rod 2515 is hardened and the folded section 2525 is securely affixed using the adhesive 2630, the vehicle washer brush panel 2505 can be quickly and easily inserted into and extracted from a core (e.g., core 2105 of FIG. 21). The vehicle washer brush panels 2505 can be inserted into and extracted from a core with ease, even after an extended period of time, and even if the core has become corroded with use and time. In some embodiments, rather than using an adhesive, other means can be used to attach the folded section 2525 to the brush panel 2505 such as a stitching, thread, staples, zipper, or the like.

Figures 27A, 27B, 27C:
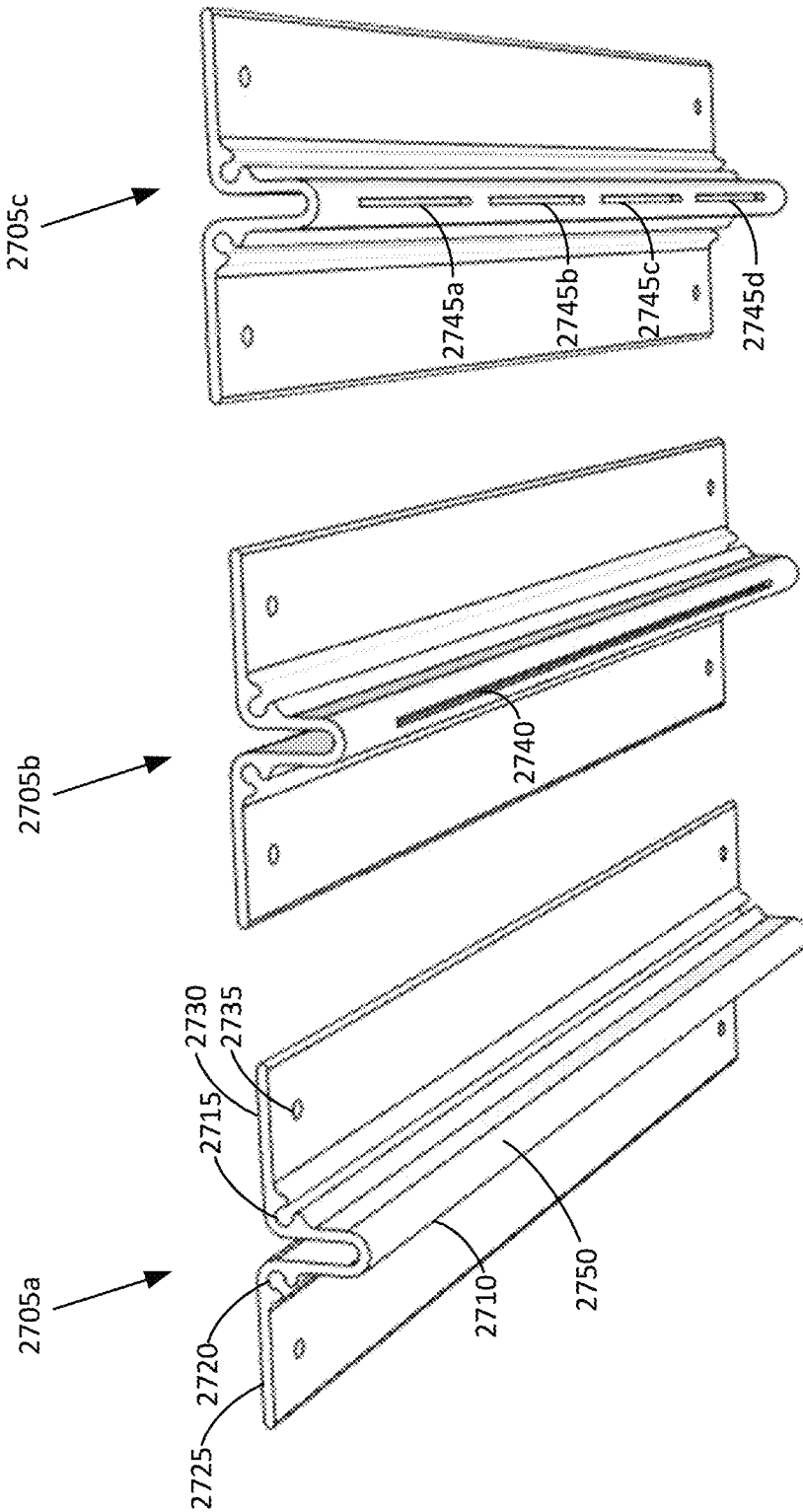
FIGS. 27A through 27C illustrate a perspective view of various vehicle washer channel well devices in accordance with some embodiments of the present inventive concept.

FIGS. 27A through 27C illustrate a perspective view of various vehicle washer channel well devices (e.g., 2705a, 2705b, and 2705c) in accordance with some embodiments of the present inventive concept. FIG. 27A shows a vehicle washer channel well device 2705a. FIG. 27B shows a vehicle washer channel well device 2705b. FIG. 27C shows a vehicle washer channel well device 2705c. It will be understood that these are examples of vehicle washer channel well devices. When referring to a reference numeral of FIG. 27A, the description provided for that reference numeral may apply equally to the vehicle washer channel well devices of FIGS. 27B and 27C. In other words, a description of some parts of one vehicle washer channel well device is not necessarily repeated for the other vehicle washer channel well device given that they share similar features.

As shown in FIG. 27A, the vehicle washer channel well device 2705a may include an elongated well 2710. The elongated well 2710 may have a rounded bottom portion 2750. It will be understood that in an alternative embodiment, the bottom portion 2750 may have another shape such as a square or rectangular base. The elongated well 2710 may be coupled to a first flange 2725 and a second flange 2730 on either side thereof. The vehicle washer channel well device 2705a may include a first elongated screw channel 2715 that is disposed at or near the point or junction between the elongated well 2710 and the first flange 2725. The vehicle washer channel well device 2705a may include a second elongated screw channel 2720 that is disposed at or near the point or junction between the elongated well 2710 and the second flange 2730. Each of the elongated screw channels (e.g., 2720) can extend a length of the elongated well 2710.

The vehicle washer channel well device 2705a may be constructed of a suitably hard material such as metal, plastic, or a composite material. In a preferred embodiment, the vehicle washer channel well device 2705a is constructed of aluminum. The vehicle washer channel well device 2705a may be manufactured by extrusion. In other words, a metal such as aluminum may be forced to flow through a die of a cross section that corresponds to a cross section of the vehicle washer channel well device 2705a. The vehicle washer channel well device 2705a may be extruded to any suitable length, and then divided into two or more individual vehicle washer channel well devices. The vehicle washer channel well device 2705a may be divided at any point to make a vehicle washer channel well device having any desired length. Since the first and second elongated screw channels (e.g., 2715 and 2720) run the entire length of the vehicle washer channel well device 2705a, each individual vehicle washer channel well device divided (e.g., cut) from an original vehicle washer channel well device will be ready to be secured to a frame using screws threaded into the corresponding elongated screw channels (e.g., 2715 and 2720), as further described below. Put differently, a cross section of the vehicle washer channel well device (e.g., 2705a) at any point along the length of the elongated well (e.g., 2710) can include a cross section of the first elongated screw channel 2715 and of the second elongated screw channel 2720.

The first and second elongated screw channels (e.g., 2715 and 2720) may each be threaded (not shown). No matter where the vehicle washer channel well device 2705a is divided, there will always exist the first and second elongated screw channels (e.g., 2715 and 2720) because these channels exist along the entire length of the vehicle washer channel well device 2705a. This permits the easy manufacture of the vehicle washer channel well device 2705a and the flexibility to form individual vehicle washer channel well devices each having any desired length.

In some embodiments, the vehicle washer channel well device 2705a may include one or more openings (e.g., 2735) through which a screw or nut may be inserted, as further described below. The one or more openings may comprise a hole, for example.

As shown in FIG. 27B, the vehicle washer channel well device 2705b may include a slot opening (e.g., 2740) disposed at a bottom region of the elongated well 2710. As shown in FIG. 27C, the vehicle washer channel well device 2705b may include multiple slot openings (e.g., 2745a, 2745b, 2745c, and 2745d) disposed at a bottom region of the elongated well 2710. The slot openings can be configured to receive one or more vehicle washer brush panels having the plurality of partially embedded nodules as disclosed herein.

Figure 28A:
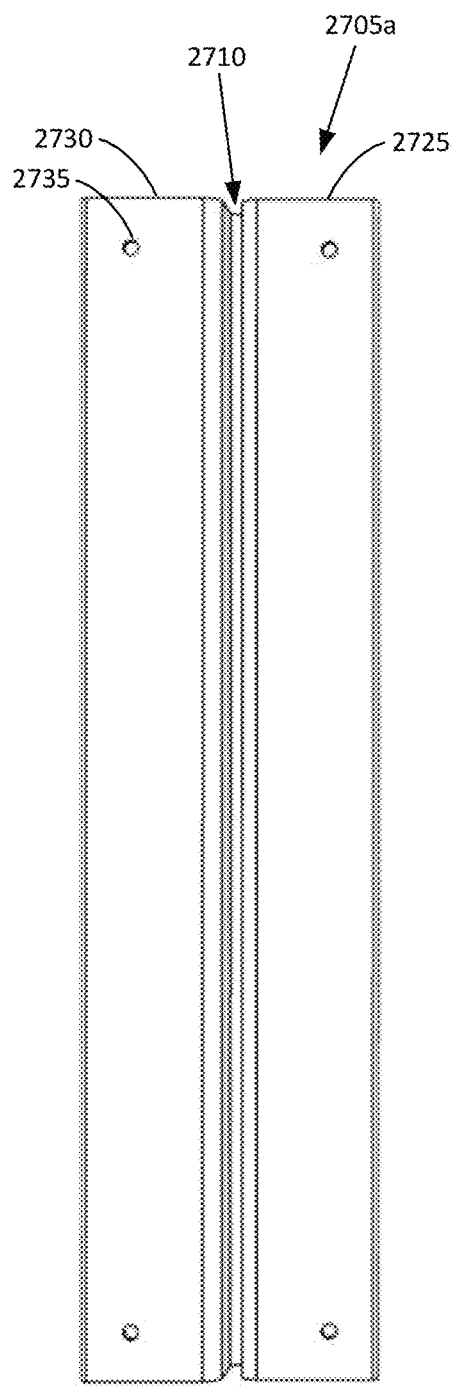
FIGS. 28A through 28C illustrate a top view of the vehicle washer channel well devices of FIGS. 27A through 27C in accordance with the some embodiments of the present inventive concept.
Figure 28B:
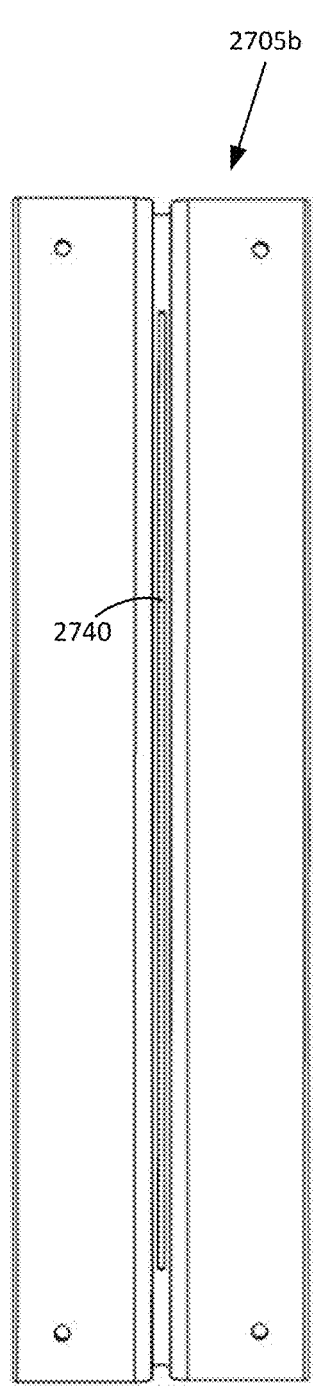
Figure 28C:
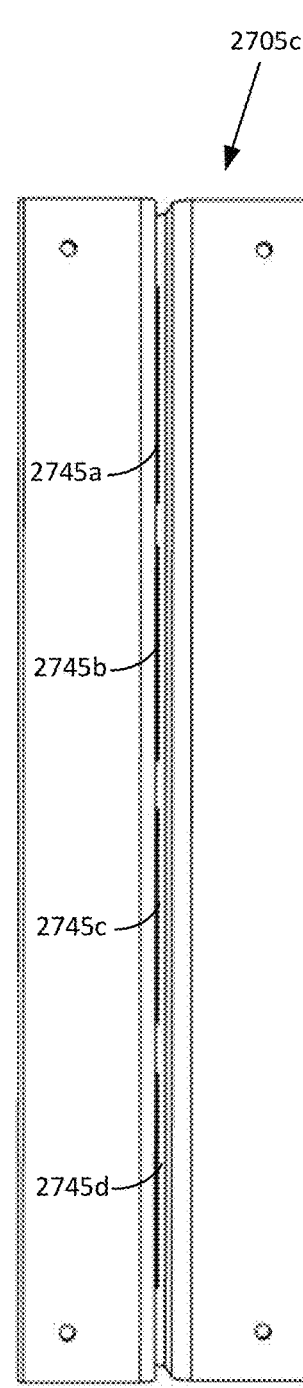

FIGS. 28A through 28C illustrate a top view of the vehicle washer channel well devices (e.g., 2705a, 2705b, and 2705c) of FIGS. 27A through 27C in accordance with the some embodiments of the present inventive concept. For the sake of brevity, a detailed description of the various components and reference numeral described above is not repeated.

Figure 29A:
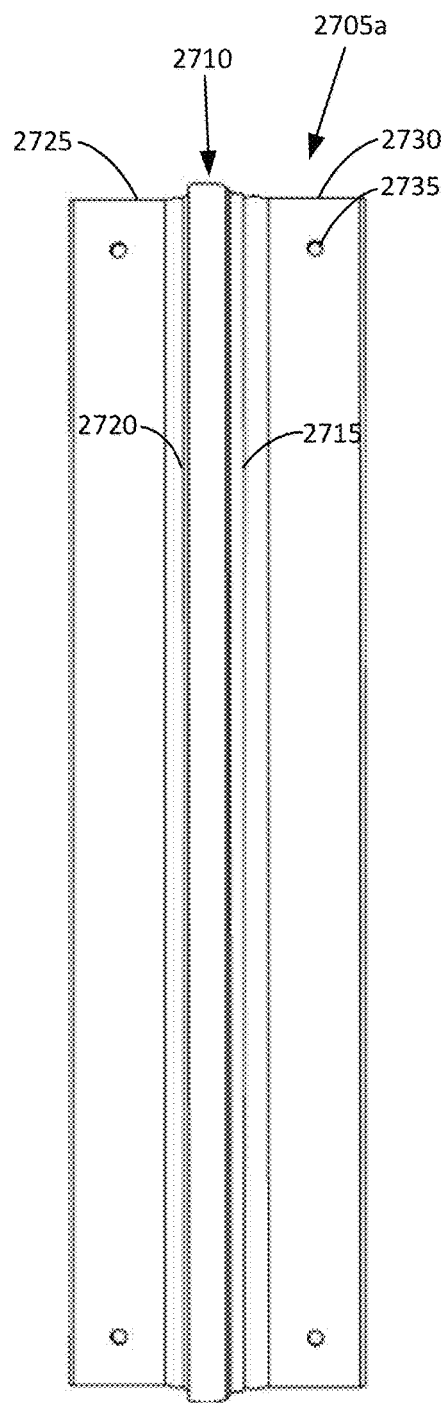
FIGS. 29A through 29C illustrate a bottom view of the vehicle washer channel well devices of FIGS. 27A through 27C in accordance with the some embodiments of the present inventive concept.
Figure 29B:
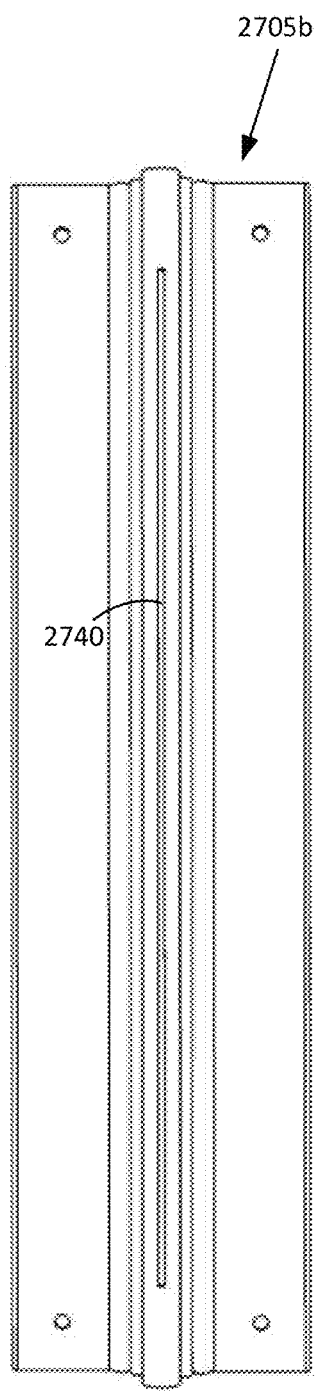
Figure 29C:
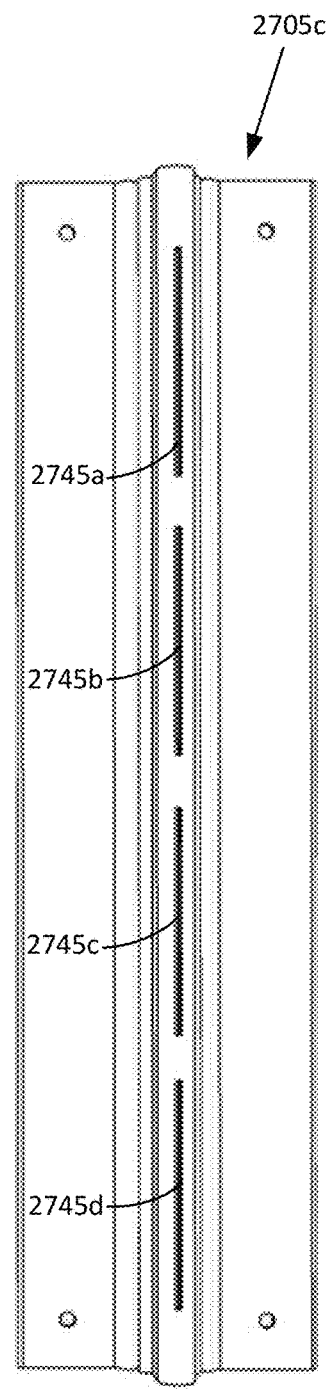

FIGS. 29A through 29B illustrate a bottom view of the vehicle washer channel well devices (e.g., 2705a, 2705b, and 2705c) of FIGS. 27A through 27C in accordance with some embodiments of the present inventive concept. For the sake of brevity, a detailed description of the various components and reference numeral described above is not repeated.

Figure 30B:
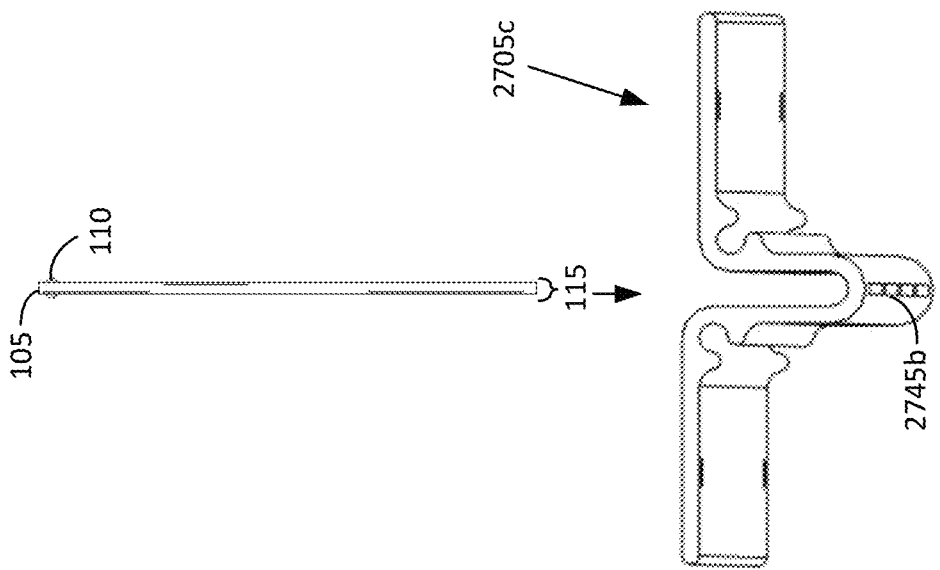
FIG. 30B illustrates a side view of the vehicle washer brush panel of FIG. 1A being inserted into a vehicle washer channel well device of FIG. 27C in accordance with some embodiments of the present inventive concept.
Figure 30A:
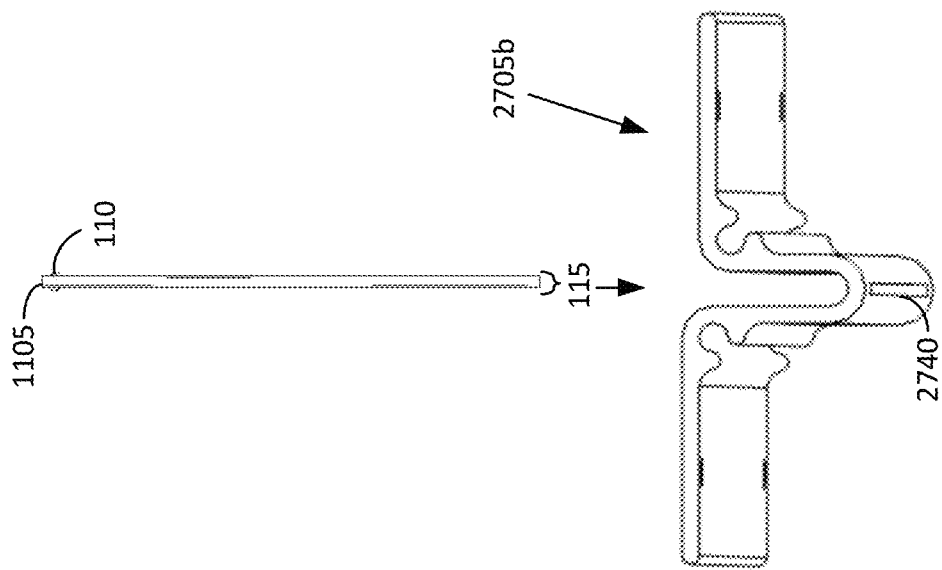
FIG. 30A illustrates a side view of the vehicle washer brush panel of FIG. 11 being inserted into a vehicle washer channel well device of FIG. 27B in accordance with some embodiments of the present inventive concept.

FIG. 30A illustrates a side view of the vehicle washer brush panel 1105 of FIG. 11 being inserted into a slot opening (e.g., 2740) of a vehicle washer channel well device 2705b of FIG. 27B in accordance with some embodiments of the present inventive concept. For the sake of brevity, a detailed description of the various components and reference numeral described above is not repeated.

FIG. 30B illustrates a side view of the vehicle washer brush panel 105 of FIG. 1A being inserted into a slot opening (e.g., 2745b) of a vehicle washer channel well device 2705c of FIG. 27C in accordance with some embodiments of the present inventive concept. For the sake of brevity, a detailed description of the various components and reference numeral described above is not repeated.

Figure 31B:
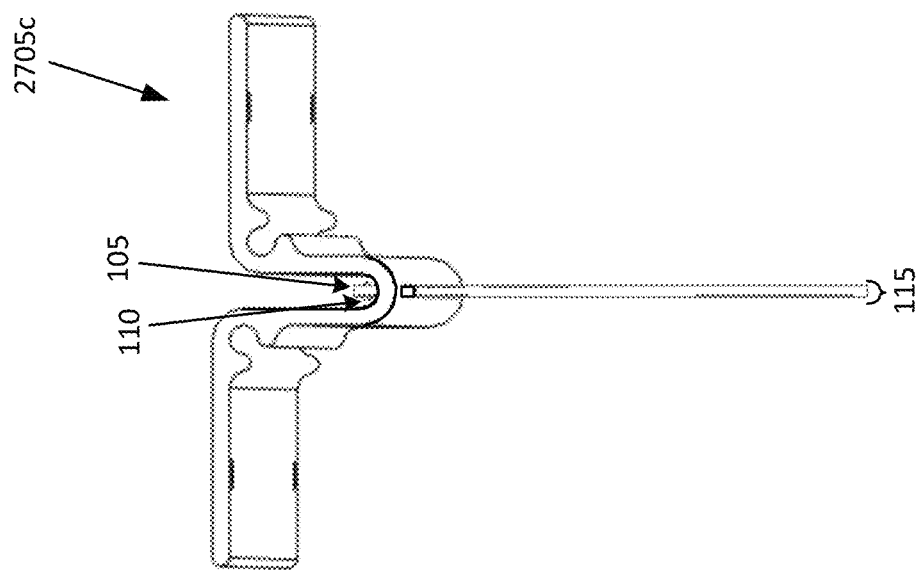
FIG. 31B illustrates a side view of the vehicle washer brush panel of FIG. 1A inserted into a vehicle washer channel well device of FIG. 27C in accordance with some embodiments of the present inventive concept.
Figure 31A:
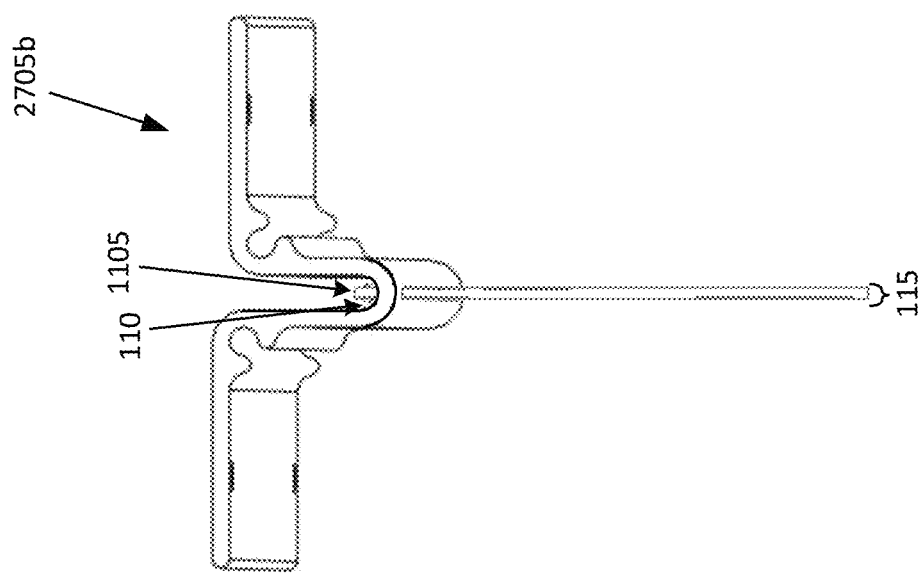
FIG. 31A illustrates a side view of the vehicle washer brush panel of FIG. 11 inserted into a vehicle washer channel well device of FIG. 27B in accordance with some embodiments of the present inventive concept.

FIG. 31A illustrates a side view of the vehicle washer brush panel 1105 of FIG. 11 inserted into a vehicle washer channel well device 2705b of FIG. 27B in accordance with some embodiments of the present inventive concept. The nodules 110 prevent the vehicle washer brush panel 1105 from slipping all the way through the vehicle washer channel well device 2705b. For the sake of brevity, a detailed description of the various components and reference numeral described above is not repeated.

FIG. 31B illustrates a side view of the vehicle washer brush panel 105 of FIG. 1A inserted into a vehicle washer channel well device 2705c of FIG. 27C in accordance with some embodiments of the present inventive concept. The nodules 110 prevent the vehicle washer brush panel 105 from slipping all the way through the vehicle washer channel well device 2705c. For the sake of brevity, a detailed description of the various components and reference numeral described above is not repeated.

After insertion into the corresponding washer channel well devices (e.g., 2705b and 2705c), the vehicle washer brush panels (e.g., 1105 and 105) may be used to wash an exterior of a vehicle as part of an automated vehicle washing system. More specifically, the fingers 115 of the vehicle washer brush panels (e.g., 1105 and 105) may be used to wash an exterior of a vehicle as part of an automated vehicle washing system.

Figure 32:
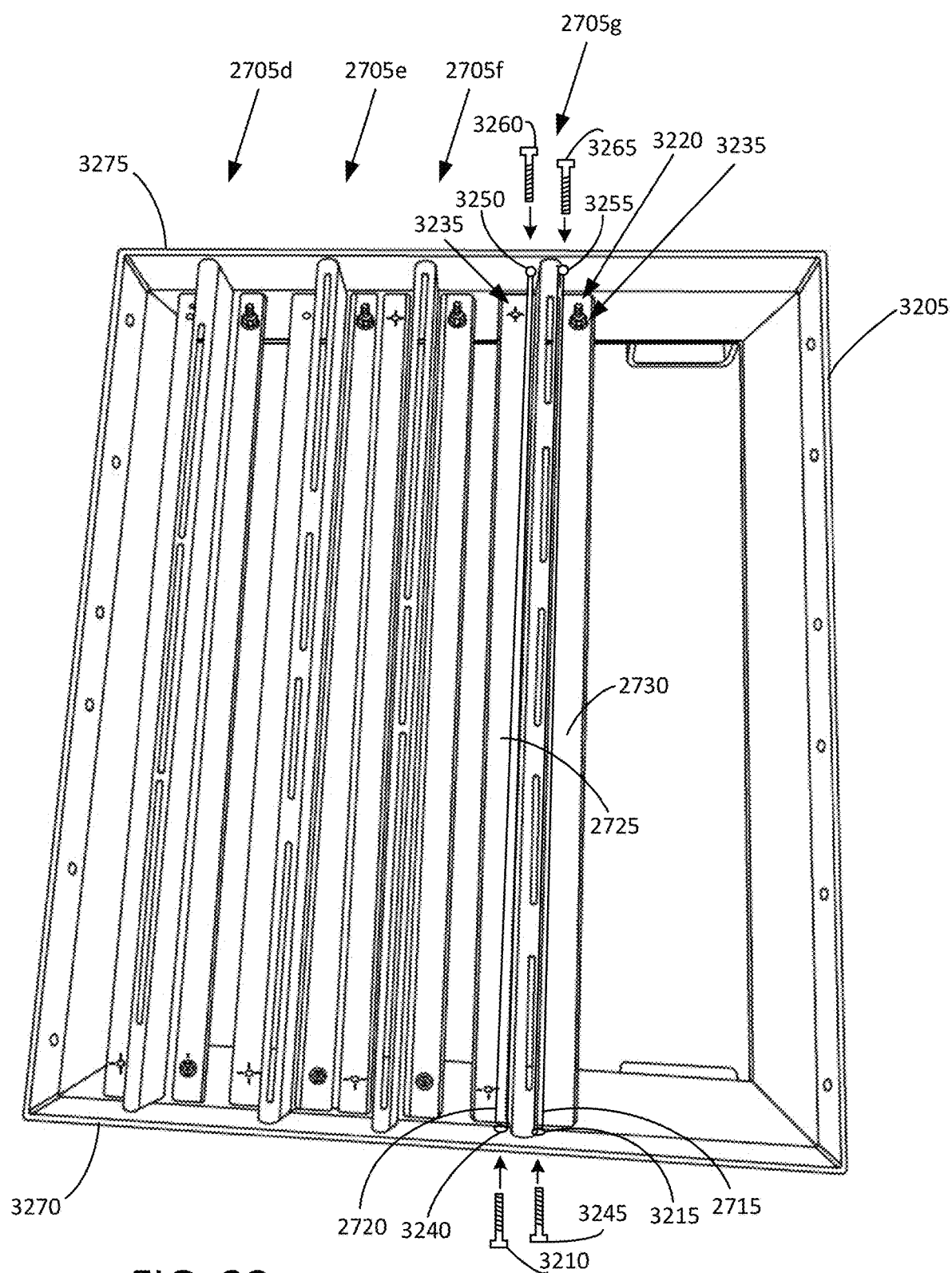
FIG. 32 illustrates a bottom view of a frame for securing one or more vehicle washer channel well devices in accordance with some embodiments of the present inventive concept.

FIG. 32 illustrates a bottom view of a frame 3205 for securing one or more vehicle washer channel well devices (e.g., 2705d, 2705e, 2705f, and 2705g) in accordance with some embodiments of the present inventive concept. As can be seen in FIG. 32, the vehicle washer channel well devices can include any suitable number of slot openings for receiving vehicle washer brush panels. In addition, the slot openings may be of any suitable size to match the width of the vehicle washer brush panels. Each of the vehicle washer channel well devices may include a first elongated screw channel (e.g., 2715) and a second elongated screw channel (e.g., 2720).

The frame 3205 may be constructed of a suitably hard material such as metal, plastic, or a composite material. In a preferred embodiment, the frame 3205 is constructed of aluminum. The frame 3205 may include an opening (e.g., 3240) in a side thereof. A screw (e.g., 3210) may be inserted through the opening (e.g., 3240) and screwed into the corresponding elongated screw channel (e.g., 2720). Four screws may be used (e.g., 3210, 3245, 3260, and 3265), two on each end of the vehicle washer channel well device (e.g., 2705g). The screws (e.g., 3210) cause each of the vehicle washer channel well devices (e.g., 2705g) to be securely fastened to the frame 3205. The vehicle washer channel well devices (e.g., 2705g) may further be secured or attached to the frame 3205 using a nut and bolt (e.g., 3220) inserted through the corresponding openings (e.g., 3235) in the vehicle washer channel well devices (e.g., 2705g), thereby providing additional attachment points to the frame 3205.

The frame 3205 can include a first side 3270 and a second side 3275. The first flange 2725 and the second flange 2730 can be attached to the frame 3205 at the first side 3270 and at the second side 3275 of the frame 3205. The first side 3270 of the frame 3205 can include a first opening 3240 and a second opening 3215. The second side 3275 of the frame 3205 can include a third opening 3250 and a fourth opening 3255. The first opening 3240 can be a hole through the first side 3270 of the frame 3205. The second opening 3215 can be a hole through the first side 3270 of the frame 3205. The third opening 3250 can be a hole through the second side 3275 of the frame 3205. The fourth opening 3255 can be a hole through the second side 3275 of the frame 3205. A first screw 3210 can be inserted through the first opening 3240 and screwed into the first elongated screw channel 2720. A second screw 3245 can be inserted through the second opening 3215 and screwed into the second elongated screw channel 2715. A third screw 3260 can be inserted through the third opening 3250 and screwed into the first elongated screw channel 2720. A fourth screw 3265 can be inserted through the fourth opening 3255 and screwed into the second elongated screw channel 2715. In this manner, one or more of the vehicle washer channel well devices (e.g., 2705a, 2705b, and 2705c) can be securely attached to the frame 3205.

Figure 33:
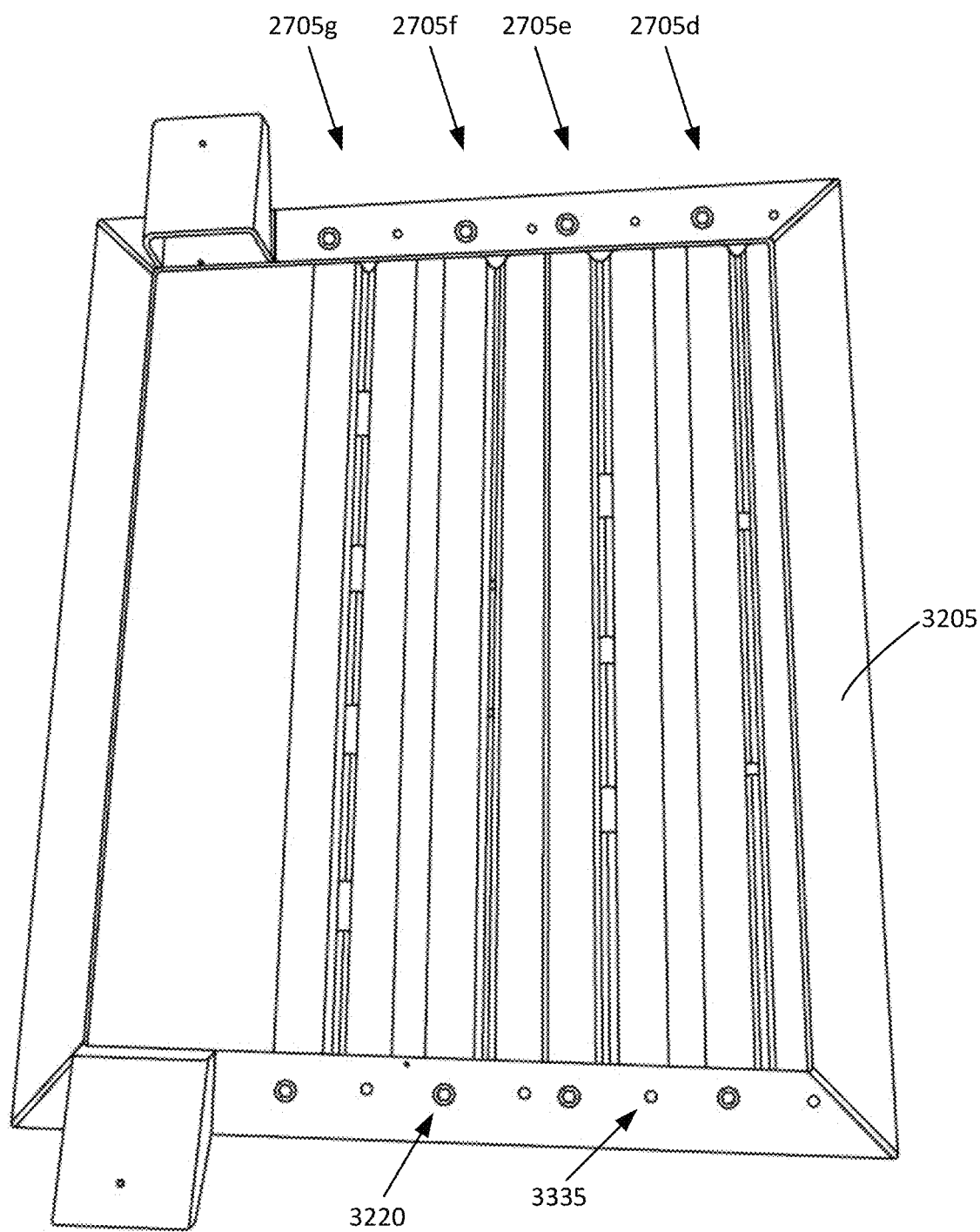
FIG. 33 illustrates a top view of the frame for securing the one or more vehicle washer channel well devices in accordance with some embodiments of the present inventive concept.

FIG. 33 illustrates a top view of the frame 3205 for securing the one or more vehicle washer channel well devices (e.g., 2705d, 2705e, 2705f, and 2705g) in accordance with some embodiments of the present inventive concept. In this figure, no vehicle washer brush panels are inserted. The one or more vehicle washer channel well devices (e.g., 2705d, 2705e, 2705f, and 2705g) may be secured to the frame 3205 using, for example, bolts (e.g., 3220) disposed through holes (e.g., 3335) in the frame 3205. The one or more vehicle washer channel well devices (e.g., 2705d, 2705e, 2705f, and 2705g) may be further secured to the frame 3205 using the screws (e.g., 3210 of FIG. 32) through the frame 3205 and into corresponding elongated screw channel (e.g., 2720 of FIG. 27A).

Figure 34:
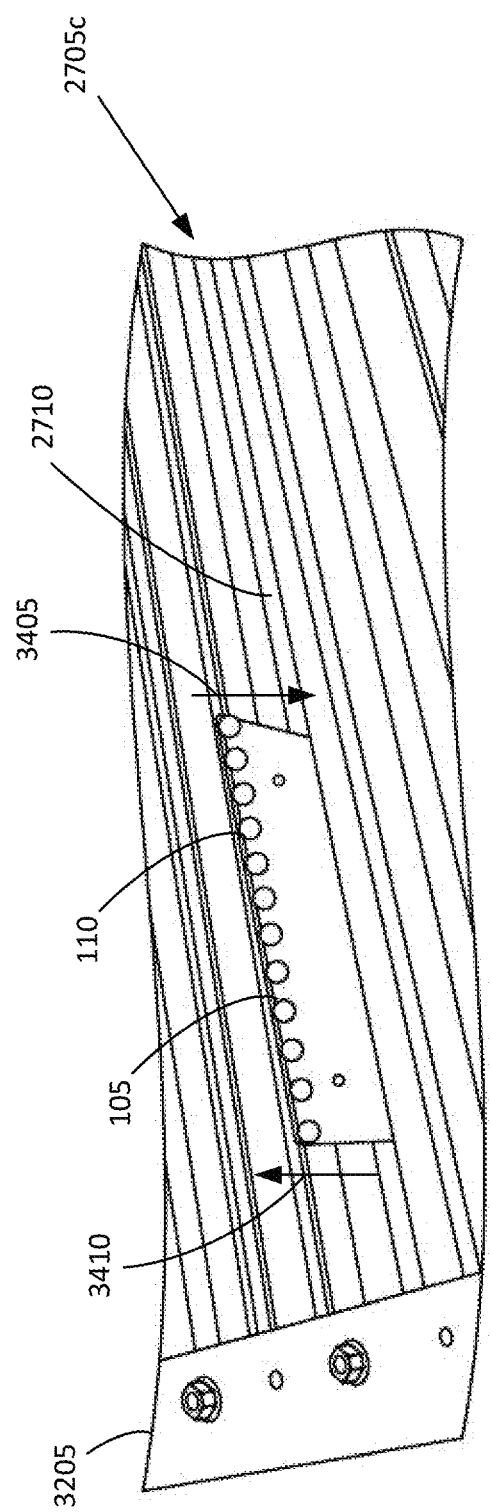
FIG. 34 shows a close-up perspective view of a vehicle washer brush panel being inserted into a vehicle washer channel well device in accordance with some embodiments of the present inventive concept.

FIG. 34 shows a close-up perspective view of a vehicle washer brush panel (e.g., 105) being inserted into a slot opening (e.g., 2745a of FIG. 27C) of the elongated well (e.g., 2710) of the vehicle washer channel well device (e.g., 2705c) in accordance with some embodiments of the present inventive concept. The vehicle washer brush panel (e.g., 105) may be dropped or otherwise inserted in a downward direction 3405 such that the vehicle washer brush panel (e.g., 105) is inserted through the slot opening (e.g., 2745a of FIG. 27C) of the elongated well 2710, stopping due to the nodules 110 being larger than the slot opening (e.g., 2745a of FIG. 27C) in the elongated well 2710. To remove the vehicle washer brush panel (e.g., 105), it is simply pushed from beneath the frame 3205 in an upward direction 3410, and then removed from the frame 3205.

Figure 35:
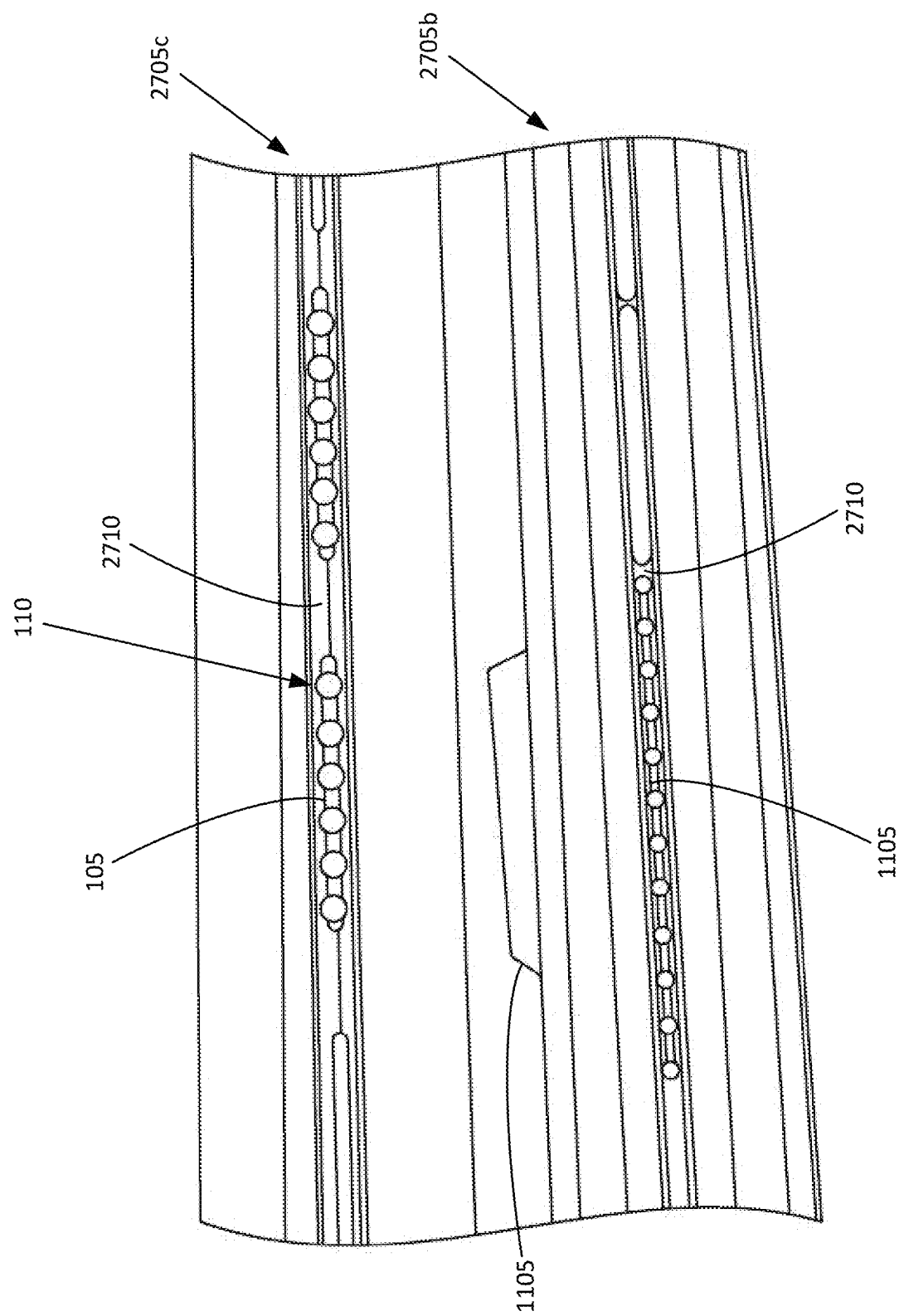
FIG. 35 shows a close-up top view of multiple vehicle washer brush panels inserted into multiple corresponding vehicle washer channel well devices in accordance with some embodiments of the present inventive concept.

FIG. 35 shows a close-up top view of multiple vehicle washer brush panels (e.g., 105 and 1105) inserted into slot openings of elongated wells (e.g., 2710) of multiple corresponding vehicle washer channel well devices (e.g., 2705c and 2705b) in accordance with some embodiments of the present inventive concept. As can be seen, the nodules (e.g., 110) prevent the vehicle washer brush panels from slipping through the slot openings of the elongated wells (e.g., 2710). It will be understood that instead of nodules 110, the vehicle washer brush panels may include a dowel, a folded piece of cloth, a stitched section, or the like to prevent the vehicle washer brush panels from slipping through the slot openings of the elongated wells (e.g., 2710). It will be understood that the nodules 110 can be of any suitable size to prevent the vehicle washer brush panel from slipping all of the way through the corresponding slot openings of the elongated wells (e.g., 2710).

Figure 36:
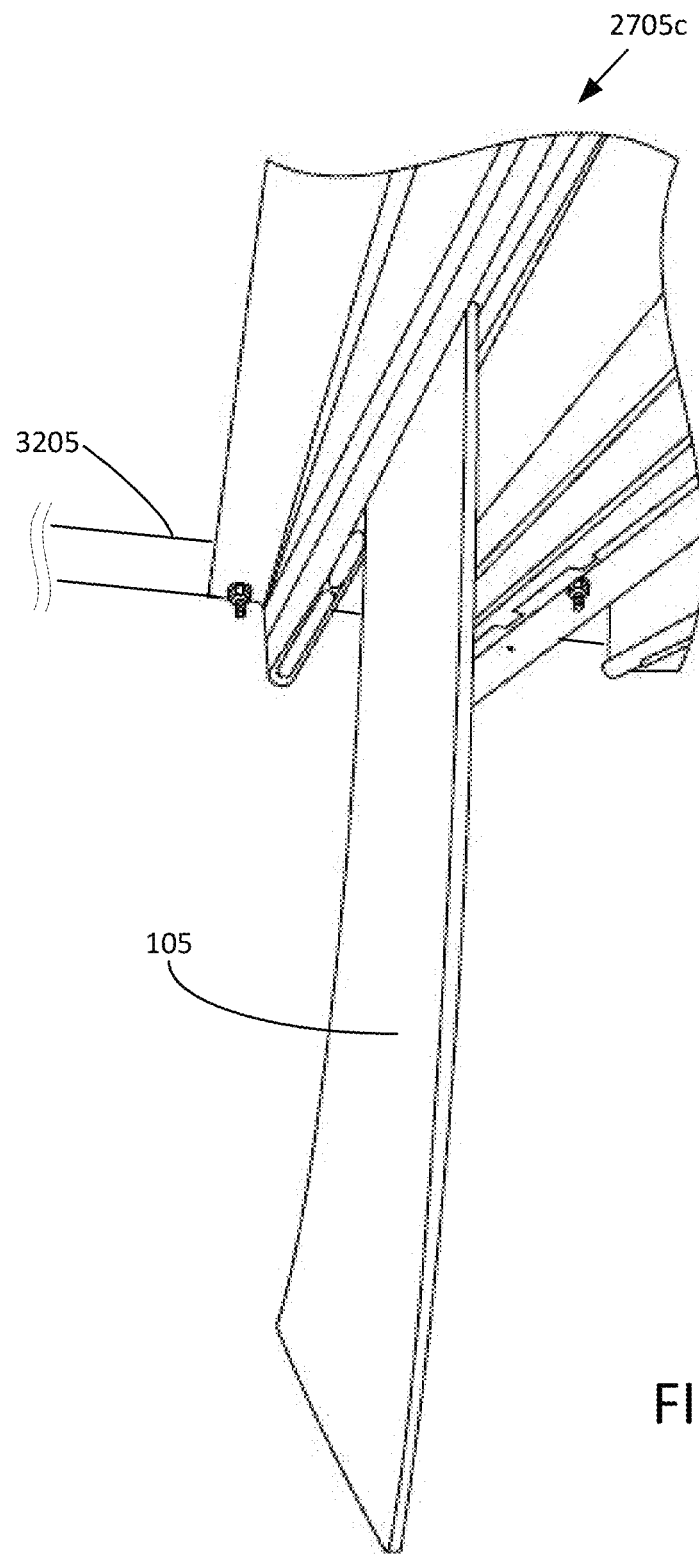
FIG. 36 shows a bottom perspective view of a vehicle washer brush panel inserted into a vehicle washer channel well device in accordance with some embodiments of the present inventive concept.

FIG. 36 shows a bottom perspective view of a vehicle washer brush panel 105 inserted into a vehicle washer channel well device 2705c in accordance with some embodiments of the present inventive concept. The vehicle washer channel well device 2705c can be secured to the frame 3205. The vehicle washer brush panel 105 may hang downward and make contact with a top of a vehicle (not shown) in an automated vehicle washing system.

The various operations of methods described above may be performed by any suitable means capable of performing the operations, such as various hardware and/or software component(s), circuits, and/or module(s).

Embodiments are described herein, and illustrated in the drawings, in terms of functional blocks, units and/or modules. A machine for producing the vehicle washer brush panels can include one or more embedded controllers, such as programmable or non-programmable logic devices or arrays, Application Specific Integrated Circuits (ASICs), embedded computers, or the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

The invention claimed is:

1. A vehicle washer brush panel, comprising:
a contiguous section that extends contiguously from a first side edge to a second side edge;
a plurality of elongated brush panel fingers that extend from the contiguous section, wherein the contiguous section further extends contiguously from a third side edge to a plurality of finger junctions joining the plurality of elongated brush panel fingers to the contiguous section; and
a plurality of partially embedded nodules that are disposed near the third side edge.

2. The vehicle washer brush panel of claim 1, wherein:
the contiguous section and the plurality of elongated brush panel fingers comprise a durable and flexible cloth material; and
the plurality of partially embedded nodules comprise a hardened material.

3. The vehicle washer brush panel of claim 2, wherein:
the plurality of partially embedded nodules are arranged in substantially a straight line that is parallel to the third side edge; and
the plurality of partially embedded nodules are securely affixed to and partially disposed within the durable and flexible cloth material of the contiguous section.

4. The vehicle washer brush panel of claim 2, wherein:
the third edge comprises an arcuate edge in two dimensions;
the plurality of partially embedded nodules are arranged in a substantially arcuate formation near the arcuate edge; and
the plurality of partially embedded nodules are securely affixed to and partially disposed within the durable and flexible cloth material of the contiguous section.

5. The vehicle washer brush panel of claim 1, wherein the plurality of partially embedded nodules comprise at least one of nylon, plastic, or polypro.

6. The vehicle washer brush panel of claim 1, wherein the plurality of partially embedded nodules are mold-injected into the contiguous section.

7. The vehicle washer brush panel of claim 1, wherein the plurality of partially embedded nodules are spaced apart from each other, and spaced apart from the third edge such that the partially embedded nodules are configured to slide into and out of a slot of a core of a vehicle washer system.

8. The vehicle washer brush panel of claim 1, wherein the contiguous section and the plurality of elongated brush panel fingers are cut from a contiguous piece of vehicle washer brush panel material.

9. The vehicle washer brush panel of claim 1, further comprising a plurality of openings, wherein each of the partially embedded nodules is mold-injected into a corresponding one of the openings.

10. The vehicle washer brush panel of claim 1, further comprising a first opening in the contiguous section and a second opening in the contiguous section, wherein the plurality of partially embedded nodules includes:
a first partially embedded nodule mold-injected into the first opening, wherein the first partially embedded nodule includes a first hemispherical portion attached to a first surface of the contiguous section, and wherein the first partially embedded nodule includes a second hemispherical portion attached to a second surface of the contiguous section that is opposite the first surface; and
a second partially embedded nodule mold-injected into the second opening, wherein the second partially embedded nodule includes a first hemispherical portion attached to the first surface of the contiguous section, and wherein the second partially embedded nodule includes a second hemispherical portion attached to the second surface of the contiguous section that is opposite the first surface.

11. The vehicle washer brush panel of claim 10, wherein the first partially embedded nodule is adjacent to the second partially embedded nodule.

12. The vehicle washer brush panel of claim 11, wherein the first partially embedded nodule is touching the second partially embedded nodule.

13. The vehicle washer brush panel of claim 1, wherein:
the plurality of partially embedded nodules are arranged in substantially a straight line that is parallel to the third side edge to form a straight line arrangement of the partially embedded nodules; and
the straight line arrangement of the partially embedded nodules extends from the first side edge of the contiguous section to the second side edge of the contiguous section.

14. The vehicle washer brush panel of claim 13, wherein each of the partially embedded nodules touches at least one other partially embedded nodule from among the plurality of partially embedded nodules.

15. The vehicle washer brush panel of claim 13, further comprising a plurality of openings in the contiguous section, wherein:
the plurality of partially embedded nodules are securely affixed to the durable and flexible cloth material of the contiguous section; and
the plurality of partially embedded nodules are partially and permanently disposed within corresponding openings from among the plurality of openings within the durable and flexible cloth material of the contiguous section.

16. The vehicle washer brush panel of claim 1, wherein:
the contiguous section and the plurality of elongated brush panel fingers comprise a durable and flexible cloth material;
the plurality of partially embedded nodules comprise a hardened material;
the third edge of the contiguous section comprises an arcuate edge that extends from the first edge of the contiguous section to the second edge of the contiguous section; and
the contiguous section is a non-folded single-layer contiguous section.

17. The vehicle washer brush panel of claim 16, wherein:
the plurality of partially embedded nodules are arranged in a substantially arcuate formation near the arcuate edge; and
the arcuate formation of the partially embedded nodules extends from the first side edge of the contiguous section to the second side edge of the contiguous section.

18. The vehicle washer brush panel of claim 17, wherein each of the partially embedded nodules touches at least one other partially embedded nodule from among the plurality of partially embedded nodules.

19. The vehicle washer brush panel of claim 17, further comprising a plurality of openings in the contiguous section, wherein:
the plurality of partially embedded nodules are securely affixed to the durable and flexible cloth material of the contiguous section; and
the plurality of partially embedded nodules are partially and permanently disposed within corresponding openings from among the plurality of openings within the durable and flexible cloth material of the contiguous section.

\* \* \* \* \*